United States Patent [19]
Fujiwara

[11] Patent Number: 5,805,212
[45] Date of Patent: Sep. 8, 1998

[54] VIBRATION CORRECTING APPARATUS CONTROLLING THE GAIN OF THE CONTROL CIRCUIT

[75] Inventor: Akihiro Fujiwara, Yokohama, Japan

[73] Assignee: Canon Kabushiki Kaisha, Tokyo, Japan

[21] Appl. No.: 558,527

[22] Filed: Nov. 16, 1995

[30] Foreign Application Priority Data

Nov. 17, 1994 [JP] Japan .................................. 6-309560
Mar. 15, 1995 [JP] Japan .................................. 7-082103
Jun. 30, 1995 [JP] Japan .................................. 7-186517

[51] Int. Cl.$^6$ ............................................. H04N 5/232
[52] U.S. Cl. ........................................ 348/208; 396/52
[58] Field of Search ..................... 348/208, 207, 348/699; 396/52, 53

[56] References Cited

U.S. PATENT DOCUMENTS

| | | | |
|---|---|---|---|
| 4,780,739 | 10/1988 | Kawakami et al. | 348/208 |
| 5,170,255 | 12/1992 | Yamada et al. | 348/208 |
| 5,534,967 | 7/1996 | Matsuzawa | 396/52 |
| 5,619,030 | 4/1997 | Shiomi | 348/208 |

*Primary Examiner*—Wendy Garber
*Attorney, Agent, or Firm*—Fitzpatrick, Cella, Harper & Scinto

[57] ABSTRACT

A vibration correcting device comprising a movement sensor for detecting vibration, a vibration correcting system for correcting the vibration, a control circuit for controlling the vibration correcting system according to the output of the movement sensor, and a characteristics control circuit for varying the frequency characteristics of the control circuit according to the function state of the vibration correcting system, wherein the control is conducted in such a manner that, when the vibration correcting system reaches a predetermined state, the gain of the control circuit within a predetermined frequency range is lowered to a predetermined level but the gain in a range lower than the above-mentioned frequency range is substantially not lowered.

24 Claims, 18 Drawing Sheets

FREQUENCY CHARACTERISTIC CHANGE OF LIMITING UNIT

FREQUENCY CHARACTERISTIC CHANGE OF LIMITING UNIT

FREQUENCY CHARACTERISTIC
CHANGE OF LIMITING UNIT

VIBRATION CORRECTING APPARATUS CONTROLLING THE GAIN OF THE CONTROL CIRCUIT

BACKGROUND OF THE INVENTION

1. Field of the Invention

The present invention relates to an improvement of a vibration relaxing device adapted for use in an image taking device such as a still camera or a movie camera.

2. Related Background Art

The conventional vibration correcting device is provided with detection means for detecting the vibration applied to apparatus, such as an image-taking apparatus, on which the vibration correcting device is mounted, limiting means for directly or indirectly receiving the output of the detection means and, with the addition of certain limitations, generating a signal adapted for correcting the vibration to the received signal, correction means for effecting a correcting operation by directly or indirectly receiving the signal, and control means for varying the state of the limiting means according to the value of the signal.

The above-mentioned limiting means is composed, for example, of a high-pass filter with a variable cut-off frequency. The absolute value of a target angle signal is used for limitation, and the cut-off frequency of the high-pass filter is shifted higher with the increase of the absolute value. In this algorithm the cut-off frequency is raised in response to the detection of a panning operation. Therefore the vibration correcting function remains ineffective for a low frequency component with a constant direction of movement as in the panning operation, so that there can be prevented unpleasant feeling in the obtained image, resulting from the function of the vibration correcting means in the course of a panning operation.

However, if the cut-off frequency is simply determined as a function of the absolute value of the target angle signal, there will be given a very unpleasant image at the end of the panning operation, since, when the correcting means returns to the central position with the return of the cut-off frequency to the original state, the target angle signal shows a significant overrun to the opposite side by the returning inertia. Such overrun phenomenon is prevented by giving a large time constant only to the return of the cut-off frequency to the lower side.

In the following there will be given a more detail explanation on this phenomenon. If the characteristics of the high-pass filter is simply shifted to the higher frequency side, as shown in FIG. 4, at the detection of a panning operation, there will result an overrun at the end of the panning operation, as indicated by 111 in FIG. 11, by the behavior of the variable angle prism because of the following reason.

Such panning operation is an operation of moving the camera or the like continuously in one direction, and provides a signal of low-frequency components as the component of movement.

With the start of the panning operation, the movement thereof is detected by a gyro sensor, and the variable angle prism is driven in a direction opposite to the direction of the movement. When the correction angle of the variable angle prism exceeds a predetermined amplitude, the panning operation is identified and the cut-off frequency of the high-speed filter is shifted to the high-frequency side, thereby inhibiting the response of the variable angle prism to the low-frequency components corresponding to the panning operation. Thus, the variable angle prism is prevented from following the panning operation.

Consequently, the variable angle prism terminates the following motion in the direction of movement of the camera, and is returned to the center position.

However, in case the cut-off frequency of the high-pass filter is shifted to the high-frequency side, an overshoot is generated in the filter characteristics when the cut-off frequency is returned to the original state at the end of the panning operation.

For this reason, there has been conventionally employed, as explained in the foregoing, a method increasing the time constant in the returning operation of the variable angle prism in order to avoid such overshoot phenomenon, but, in such method, the variable angle prism requires a long time before becoming capable again of the ordinary vibration correcting function after the end of the panning operation, and such phenomenon may become an obstacle in the operation.

An example of such conventional devices will be explained with reference to FIGS. 1 to 5.

Referring to FIG. 1, a gyro sensor 11 constituting detection means detects the angular velocity of the movement of the device, and its detection output is supplied to a high-pass filter 12 constituting limiting means. The high-pass filter 12 has a configuration as shown in FIG. 2 or 3, wherein the cut-off frequency varies according to the on/off time ratio of an analog switch SW1 or SW2, thereby varying the level of limitation on the input component. More specifically, as shown in FIG. 4, the cut-off frequency $f_c$, is shifted to a higher value $f_H$ when the switch SW1 or SW2 is turned on.

The output of the high-pass filter 12 is supplied to an integration circuit 13, which integrates the angular velocity signal, limited by the high-pass filter 12, thereby converting it into an angle signal. The output of the integration circuit 13 is supplied to correction means 15.

The vertical angle of the variable angle prism 15c varies in proportion to the input to the correction means 15. The functions of a differential circuit 15a, a driving circuit 15b and the variable angle prism 15c provided in the correction means 15 will not be explained as they are not directly related to the present invention. However, in short, the variable angle prism is so controlled that the actual amount of movement thereof becomes always equal to the drive signal therefor, by feedback of the amount of movement thereof to the drive signal.

On the other hand, in FIG. 1, the output of the integration circuit 13 is also supplied to an unrepresented microcomputer and subjected to A/D conversion.

In FIG. 1, the process inside the microcomputer is represented by three blocks (absolute value circuit, delay circuit and function circuit).

The signal wave forms in these blocks are shown in FIG. 5.

At first an absolute value circuit 16 obtains the absolute value of the input signal to the correction means 15. In FIG. 5, showing the amplitude of the input signal in the ordinate and the time in the abscissa, there are shown an input signal 101 and the absolute value 102 thereof. Then a delay circuit holds the maximum value (peak) of the absolute value and determines attenuation with a long time constant from the peak value. In FIG. 5, a curve 103 indicates the attenuation. A function circuit 18 positioned next is provided with a first threshold value corresponding to an amplitude which is slightly above the amplitude of vibration in the ordinary still state of the camera, and a somewhat larger 2nd threshold value, and determines a cut-off frequency by converting the interval between the threshold values by an increasing function. Thus, the minimum and maximum cut-off frequencies are respectively set by the first and second threshold values. In practice there are involved complex processes for the setting of the threshold values, attenuation time constant, function and minimum and maximum cut-off frequencies, and a microcomputer process is effective for such setting.

The above-explained example shows the basic configuration, and there have been proposed certain improvements in the control means composed for example of a microcomputer provided with the absolute value circuit 16, the delay circuit 17 and the function circuit 18, for attaining the same objectives as those of the present invention.

Examples of such improvements are shown below:

1) A control process employing the angular velocity sensor is effected differently from the high-pass filter, taking also the time constant of the integration circuit into consideration; and 2) A control process employing the angular velocity sensor evaluates also the signal prior to the activation of the high-pass filter, thereby detecting the panning operation earlier and realizing the panning process promptly.

In any case, the delay component in the control means cannot be dispensed with, so that the use of a microcomputer is indispensable.

As explained in the foregoing, the conventional system prevents the overrun phenomenon by giving a large time constant to the returning of the cut-off frequency to the low-frequency region at the end of the panning operation, but, as a result, the correcting effect for the small vibrations is temporarily suppressed at the end of the panning operation and there is required a considerable time for the correcting effect to recover.

SUMMARY OF THE INVENTION

In consideration of the foregoing, a first object of the present invention is to provide a vibration relaxing device capable of achieving a satisfactory behavior at the end of the panning operation, without the use of expensive control means.

The foregoing object can be attained, according to a preferred embodiment of the present invention, by a vibration correcting device comprising movement detection means for detecting a movement; correction means for correcting the movement; control means for controlling the drive of the movement correction means according to the movement detection information detected by the movement detection means; and characteristics control means for varying the frequency characteristics of the control means according to the function state of the correction means, wherein the characteristic control means is adapted, when the correction means reaches a predetermined state, to lower the gain in a predetermined frequency range of the control means to a predetermined level and not to substantially lower the gain in a range lower than the predetermined frequency range.

A second object of the present invention is to provide a vibration correcting device capable of always achieving optimum correcting operation regardless of the function state thereof.

A third object of the present invention is to enable smooth and prompt transition of the mode of the vibration correcting operation, during the panning operation and when the ordinary vibration correcting state is reassumed after the panning operation.

The above-mentioned objects can be attained, according to a preferred embodiment of the present invention, by a vibration correcting device comprising movement detection means for detecting a movement, extraction means for extracting a predetermined frequency component from the movement information detected by the movement detection means, movement correction means for correcting the movement based on the signal of the predetermined frequency component extracted by the extraction means, detection means for detecting a predetermined movement state, and characteristics control means for varying the frequency characteristics of the extraction means when the predetermined movement state is detected by the detection means, wherein the characteristics control means is adapted, when the predetermined movement state is detected, to lower the gain of the extraction means in a predetermined frequency range to a predetermined level and not to substantially lower the gain in frequencies lower than the predetermined frequency range.

A fourth object of the present invention is to provide a vibration correcting device capable of prompt start-up at the start of power supply.

A fifth object of the present invention is to provide a vibration correcting device capable of minimizing the delay component in the vibration correcting system, improving the response and various operation characteristics, reducing the number of components and the space for mounting thereof, thereby enabling compactization, and electronic equipment utilizing such vibration correcting device.

A sixth object of the present invention is to provide a vibration correcting device facilitating the application of a microcomputer in the control and calculation of the vibration correcting system, and an electronic equipment utilizing such vibration correcting device.

Still other objects of the present invention, and the features thereof, will become fully apparent from the following description which is to be taken in conjunction with the attached drawings.

DETAILED DESCRIPTION OF THE PREFERRED EMBODIMENTS

Now the present invention will be clarified in detail by preferred embodiments thereof shown in the attached drawings.

Figure 1:
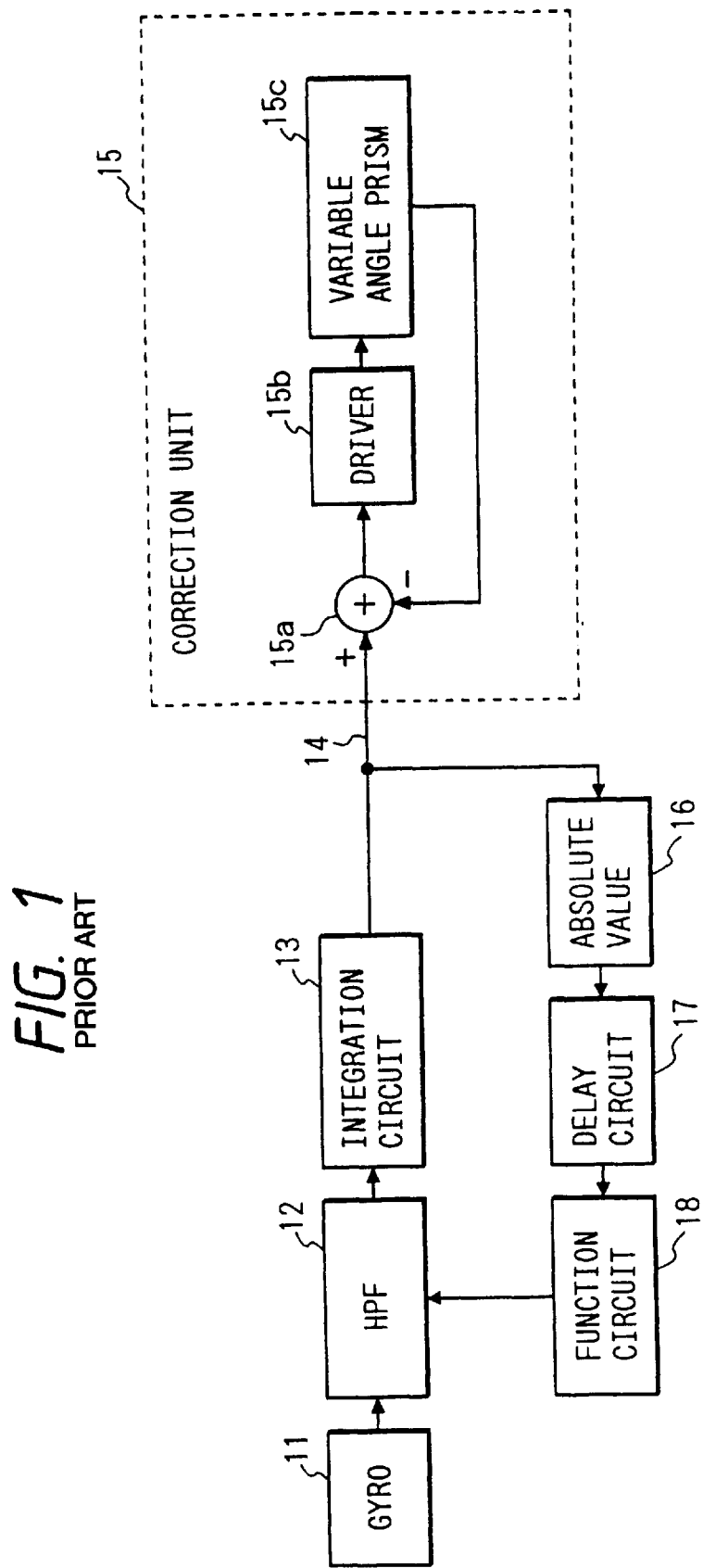
FIG. 1 is a block diagram showing schematic configuration of a conventional vibration correcting device.
Figure 6:
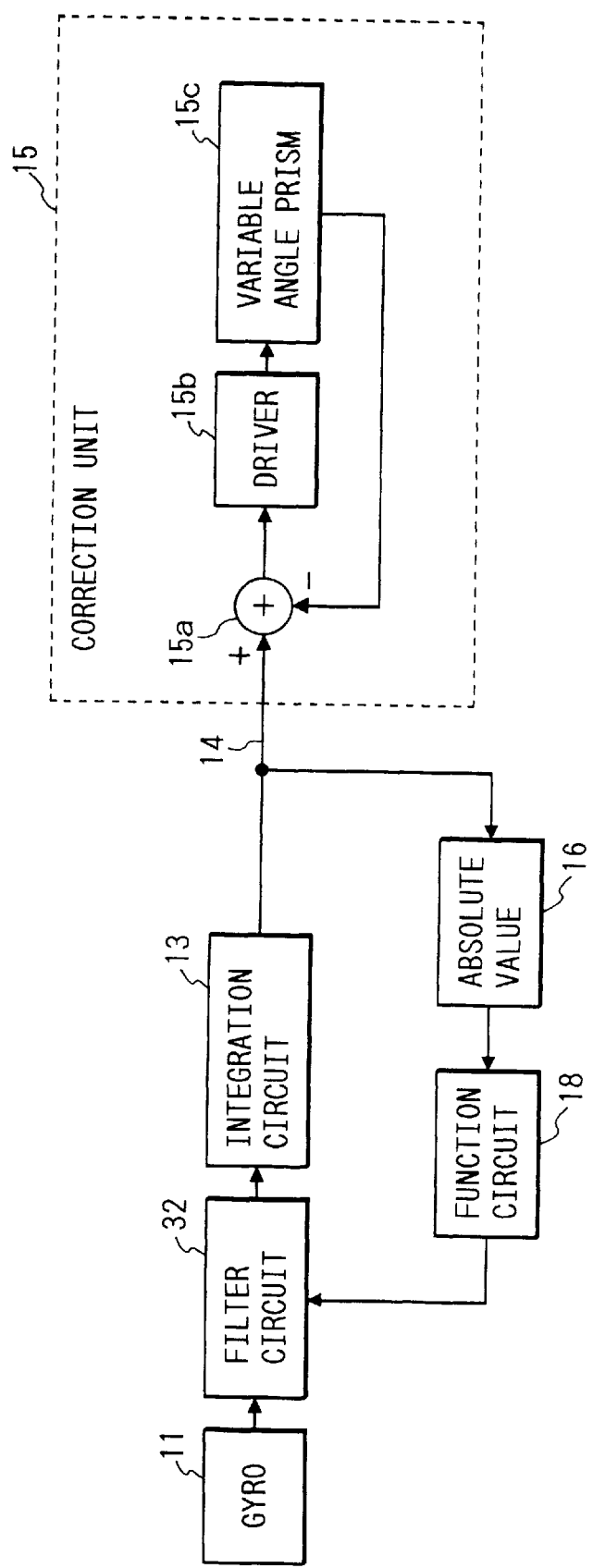
FIG. 6 is a block diagram showing schematic configuration of a vibration correcting device constituting an embodiment of the present invention.

FIG. 6 is a block diagram showing configuration of a representative vibration correcting device, comprehensively showing the concept of the present invention, wherein components equivalent in function to those in FIG. 1 are represented by same symbols.

A gyro sensor 11, constituting detection means, detects the movement, for example vibration, of an image-taking apparatus or the like on which the device is mounted. A filter circuit 32, constituting the limiting means which is a principal part of the present invention, is provided with a capacitor C22, in addition to the conventional limiting means shown in FIG. 3 (details being explained later). An integration circuit 13 serves to convert an angular velocity signal, detected by the gyro sensor 11, into an angle signal by integration. A signal line 14 sends the output of the integration circuit 13 to correction means 15 and an absolute value circuit 16 to be explained later. An absolute value circuit 16 determines the absolute value of the angle signal entered through the signal line 14. A function circuit 18 determines the characteristics of the filter circuit 32.

In the following there will be explained specific examples of the filter circuit 32, integration circuit 13, absolute value circuit 15 and function circuit 18.

Figure 7:
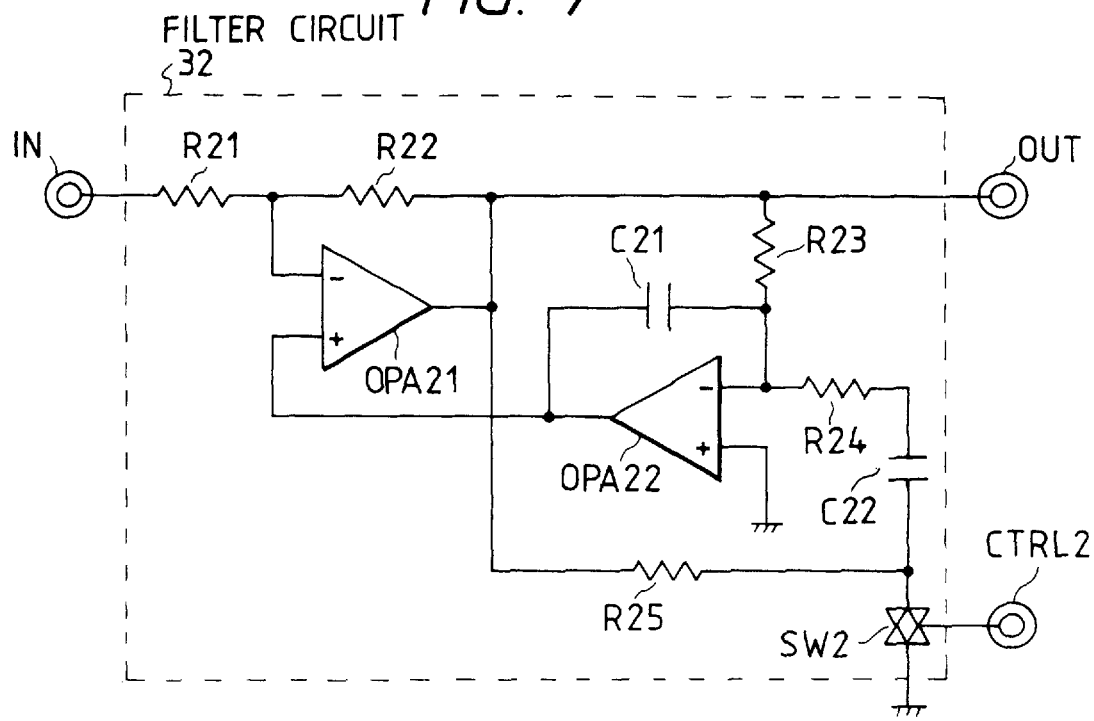
FIG. 7 is a circuit diagram showing an example of the filter circuit in FIG. 6.

At first reference is made to FIG. 7 for explaining the specific structure of the filter circuit 32.

The filter circuit 32 is composed of operational amplifiers OPA21, OPA22, resistors R21 to R25, capacitors C21, C22, and an analog switch SW22. An end of the resistor R21 is connected to the output of the gyro sensor 11 constituting the detection means; the other end of resister R21 and an end of resistor R22 are connected to the inverted input of the operational amplifier OPA21; the other end of the resistor R22 and an end of the resistor R23 to the output of the operational amplifier OPA21; the other end of the resistor R23, an end of the capacitor C21 and an end of a serial circuit of the resistor R24 and the capacitor C22 are connected to the inverted input of the operational amplifier OPA22; the other end of the capacitor C21 is connected to the output of the operational amplifier OPA21 and the non-inverted input of the operational amplifier OPA21; the other end of the serial circuit of the resistor R24 and the capacitor C22 and an end of the resistor R25 are connected to a terminal of the analog switch SW2; the other end of the resistor R25 is connected to the output of the operational amplifier OPA21; and the non-inverted input of the operational amplifier OPA22 and the other terminal of the analog switch SW2 are connected to a reference potential (ground level in case of FIG. 7).

The operational amplifier OPA21 and the resistors R21, R22 constitute an inverted amplifier circuit. Also, the operational amplifier OPA22, the resistors R23, and the capacitor C21 constitute an integration circuit, which serves to stabilize the average output DC voltage of the inverted amplifier circuit to the reference voltage (ground level) through a feedback circuit consisting of the operational amplifiers OPA21 and OPA22.

In the following there will be explained the frequency characteristics of the filter circuit 32.

In the prior art, the drawback of overrun of the correction means at the end of the panning operation is prevented, as already explained in the foregoing, by changes in the threshold values, attenuation time constant and function, which are realized in the program of the microcomputer constituting the control means.

In contrast, the present invention is to reduce the control to the minimum configuration, and to improve the characteristics of the limiting means (filter circuit), thereby completely dispensing with the delay element which has still been needed in the microcomputer process explained above.

Now let us consider a case where the returning time constant is not given in the filter circuit control, i.e. where the cut-off frequency of the high-pass filter is selected as a direct function of the absolute value of the correction amount. This corresponds to the minimum configuration of the control means in the present invention.

Figure 2:
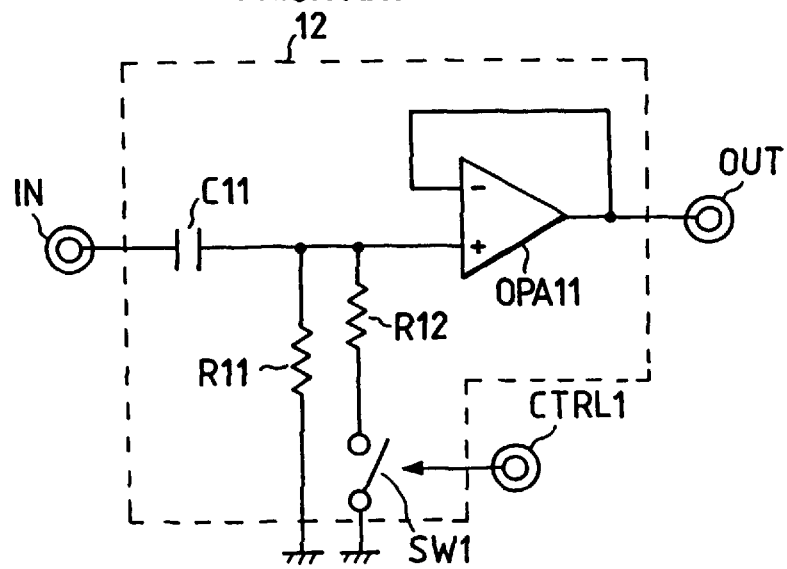
FIG. 2 is a circuit diagram showing an example of the limiting means in FIG. 1.
Figure 3:
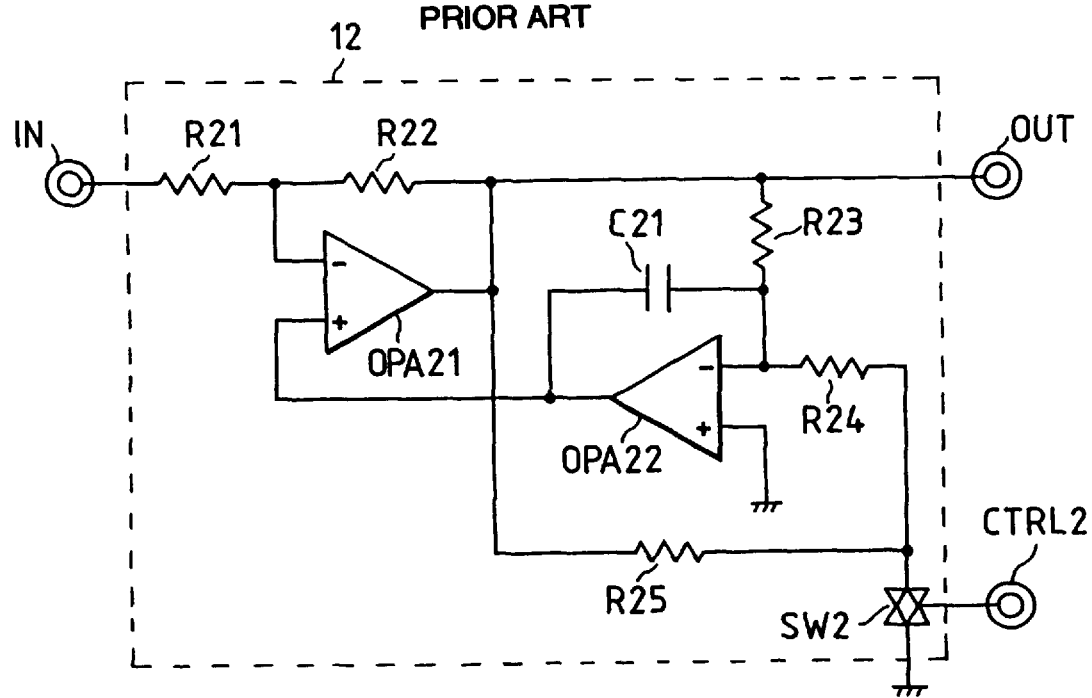
FIG. 3 is a circuit diagram showing another example of the limiting means in FIG. 1.

First considered is the case of using a conventional simple high-pass filter (as shown in FIGS. 2 and 3) as the limiting means.

After the start of panning operation, the correction amount starts to increase, and the filter circuit control is started with a certain delay from the start of the panning operation. After the end of the panning operation, the correction amount soon returns to the vicinity of the center value. On the other hand, the filter circuit control tends to respond more slowly because it is terminated after the return of the correction amount to the vicinity of the center value, and the return of the filter circuit control generates an overrun to the opposite side because of the inertia of the returning action in the vicinity of the central position. Such behavior of the correction signal is shown by a wave form 111 in FIG. 11.

For this reason, there have been investigated the filter characteristics which bring the correction amount to the vicinity of the central position at the end of the panning operation. As a result, such requirement can be basically met by a filter of the following characteristics.

The filter characteristics are shifted from a first state (those matching the still state) to a second state (those matching the panning operation) in response to the detection of a panning operation and are subsequently returned to the first state, and the characteristics of the second state are, in comparison with those of the first state, to only suppress the main component of the panning and to least affect the low-frequency characteristics which are principally related to the stationary positioning.

Figure 8:
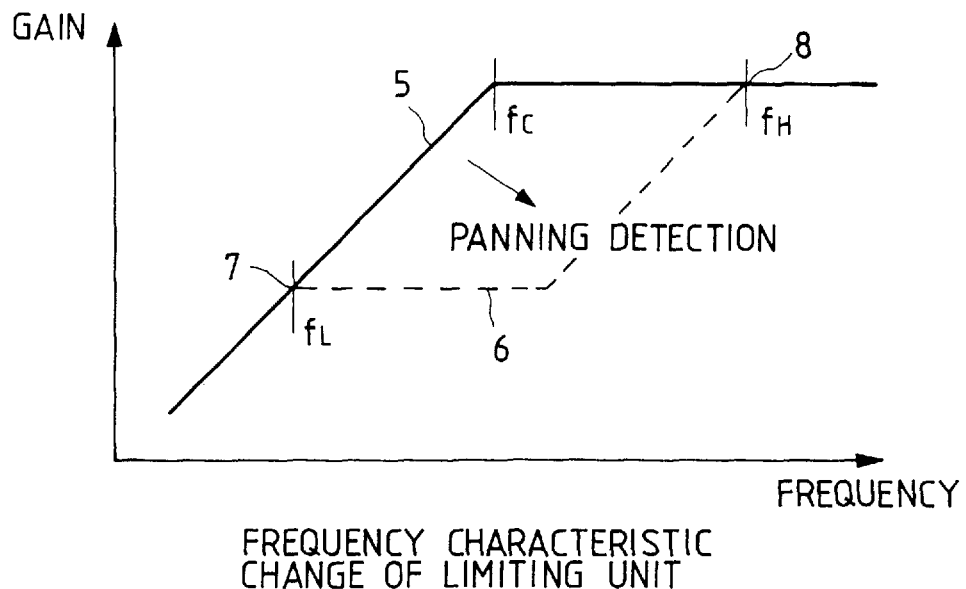
FIG. 8 is a chart showing the frequency characteristics of the filter circuit, constituting limiting means, in FIG. 7.

More specifically, there are desired, as shown in FIG. 8, characteristics that have one shoulder in the first state (solid line), as in the ordinary high-pass filter, and two shoulders in the second state (broken line). In FIG. 8, 7 indicates a first (lower) frequency and 8 indicates a second (higher) frequency.

Figure 11:
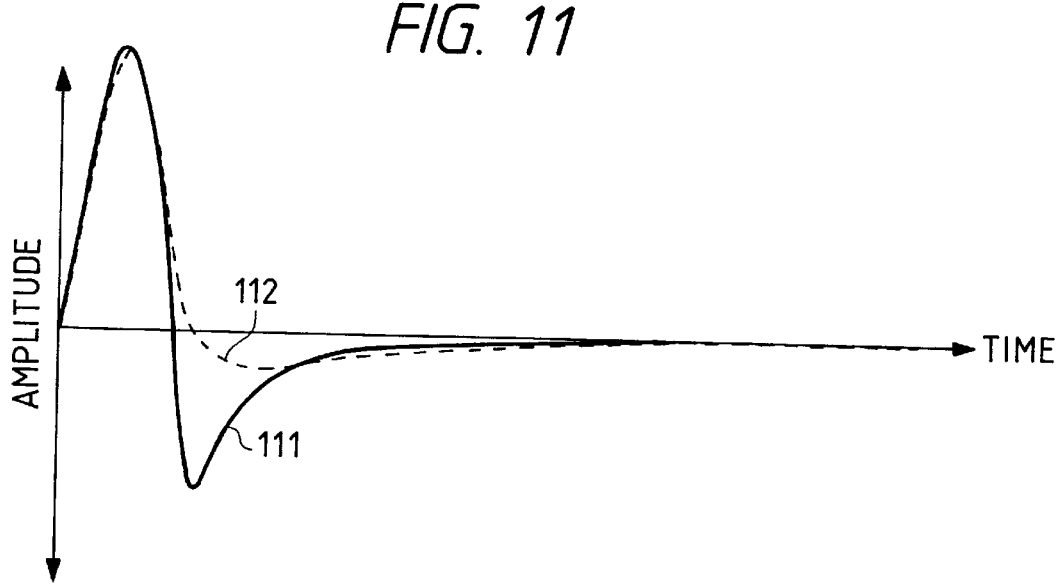
FIG. 11 is a chart showing comparison of the effect of the first embodiment of the present invention, with that of a conventional device.

With such characteristics, the correction amount at the end of the panning operation stops after slightly passing the center position and then gradually approaches to the center position, as indicated by a wave form 112 in FIG. 11.

In such filter circuit 32, the resistors R24, R25 and the capacitor C22 become effectless when the analog switch SW2 is turned on, whereby the input-output characteristics of the entire circuit become equivalent to those of a first-order high-pass filter as shown by the solid line in FIG. 8.

On the other hand, when the analog switch SW2 is turned off, the effect of the resistors R24, R25 and the capacitor C22 is added to provide two-shouldered characteristics as indicated by the broken line in FIG. 8.

It Is therefore possible to vary the characteristics continuously between the solid line and the broken line, by driving the analog switch SW2 with a square wave signal with a continuously varying duty ratio (by means of a control signal to be explained later).

Figure 9:
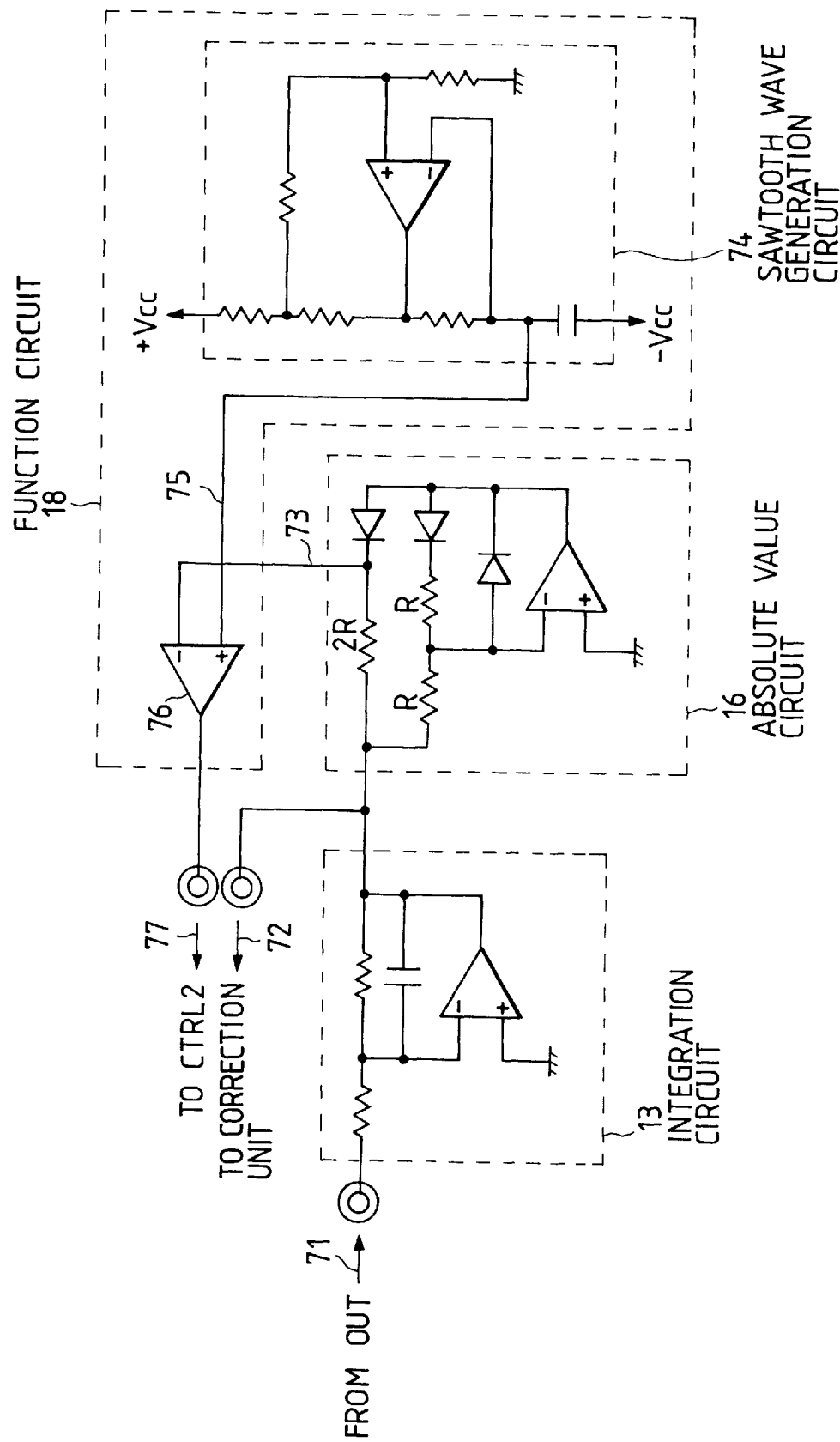
FIG. 9 is a circuit diagram showing an example of the integration circuit, the absolute value circuit and the function circuit in FIG. 7.

In the following there will be given an explanation on the configuration of the parts other than the filter circuit 23, i.e. of the integration circuit 13, the absolute value circuit 16 and the function circuit 18, with reference to FIG. 9.

The output signal (71) of the filter circuit 32 is supplied to the integration circuit 13, which has a high resistor parallel to the integrating capacitor, so that the integrated output spontaneously returns to the center value. The integration output (72) is supplied to the correction means 15 for effecting the correction drive. It is also supplied to the absolute value circuit 16, which in response releases an absolute value signal 73.

The absolute value circuit 16 employs diode switching according to the input polarity, thereby providing a high-impedance output 73.

A sawtooth wave generator circuit 74 utilizing a comparator can generate a sawtooth wave with desired upper limit, lower limit and repeating cycle time, by suitable setting of the resistors and capacitors. This sawtooth output signal and the aforementioned absolute value signal are supplied to a comparator 76, in which the level of the absolute value signal is converted into the on/off ratio of a square wave signal by a predetermined function. The square wave signal constitutes the control signal 77 and drives the analog switch SW2 in the filter circuit 32 constituting the limiting means. The function circuit 18 is constituted by the sawtooth wave generator circuit 74 and the comparator 76.

Figure 10:
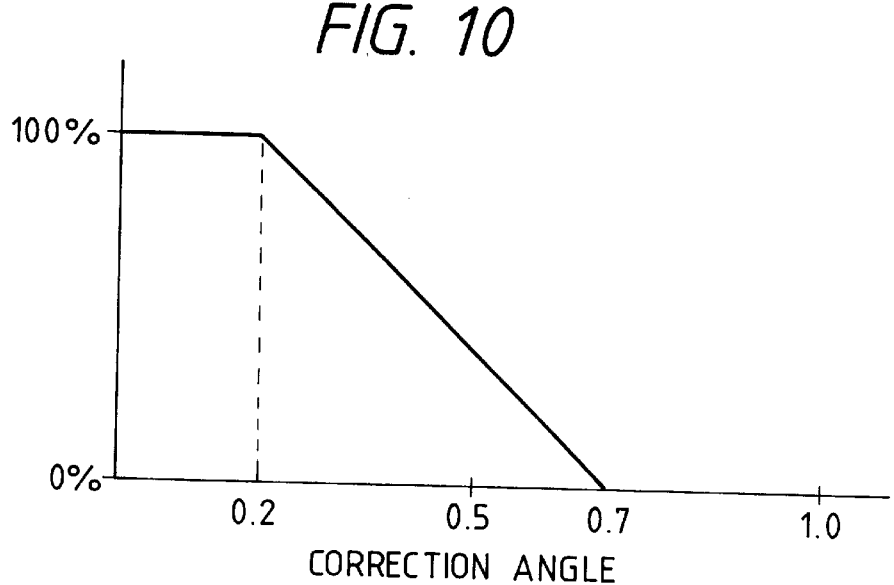
FIG. 10 is a chart showing the characteristics of the function circuit in FIG. 9.

FIG. 10 illustrates the above-mentioned predetermined function. The on/off ratio of the switch remains at 100% within a range of the correcting angle from 0 to ca. 0.2, then gradually decreases to a correcting angle of ca. 0.7, and thereafter remains at 0%. In FIG. 8, portions 5, 6 show the states of the filter circuit 32, respectively corresponding to the on/off ratio of 100% and 0%.

Figure 12:
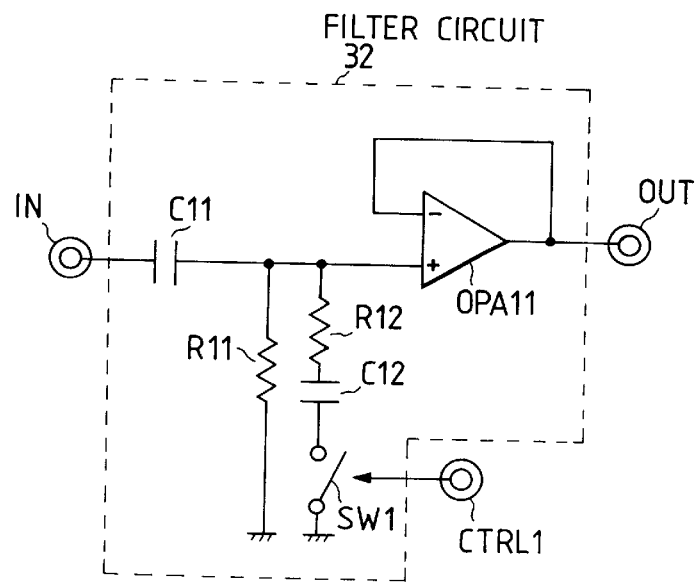
FIG. 12 is a circuit diagram showing an example of a filter circuit, employed in a second embodiment of the present invention.

FIG. 12 is a circuit diagram showing the configuration of the filter circuit 32, which has a capacitor C11 in addition to the conventional limiting means shown in FIG. 2.

In the filter circuit 32 of the second embodiment, the input (receiving signal from the gyro sensor 11 which is not shown in FIG. 12) is connected to an end of the capacitor C11, while the output is connected to the other end of the capacitor C11, and an end of the resistor R11 and an end of a serial circuit of the resistor R12, a capacitor C12 and an analog switch SW1, and the reference potential (ground level in FIG. 12) is connected to the other ends of the resistor R11 and the above-mentioned serial circuit.

When the analog switch SW1 (corresponding to the analog switch SW2 in FIG. 7) is turned off, a first-order high-pass filter is constituted by the capacitor C11 and the resistor R11, providing characteristics as indicated by the solid line in FIG. 8. In the turned-off state of the analog switch SW1, it is equivalent to the circuit configuration shown in FIG. 2.

Figure 4:
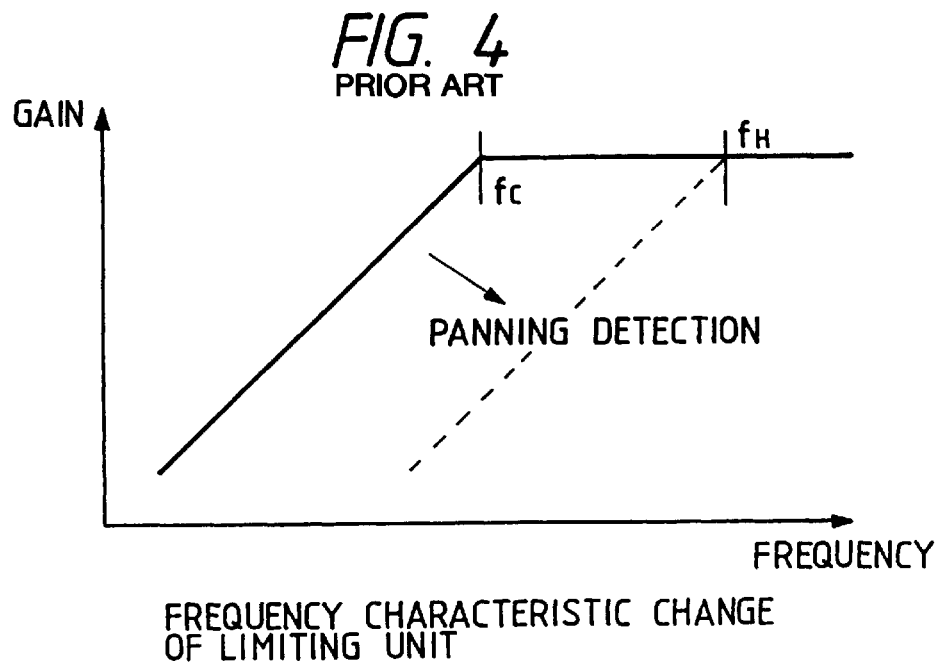
FIG. 4 is a chart showing frequency characteristics of the limiting means.
Figure 5:
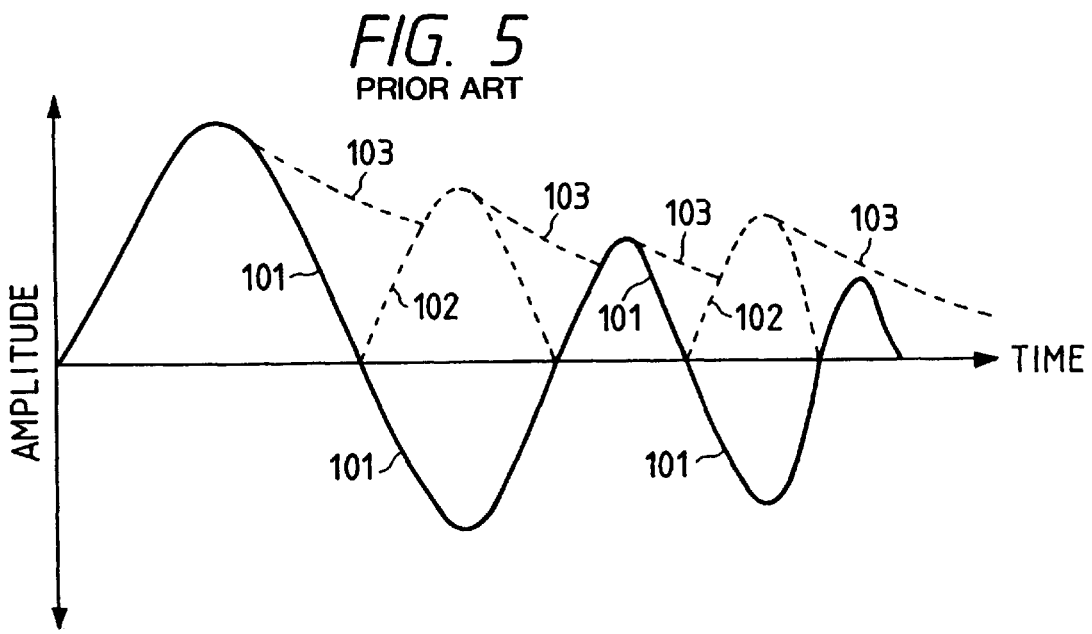
FIG. 5 is a chart showing an absolute value process and a delay process in the vibration correcting device.

When the analog switch SW1 is turned on, the conventional configuration in FIG. 2 merely shows a change in the cut-off frequency as indicated by the broken line in FIG. 4, but the filter circuit in the second embodiment of the present invention realizes the characteristics as indicated by the broken line in FIG. 8. Also the limiting varies as shown in FIG. 13, by the variation of the value of the resistor R12 while the analog switch SW1 is turned off.

Figure 13:
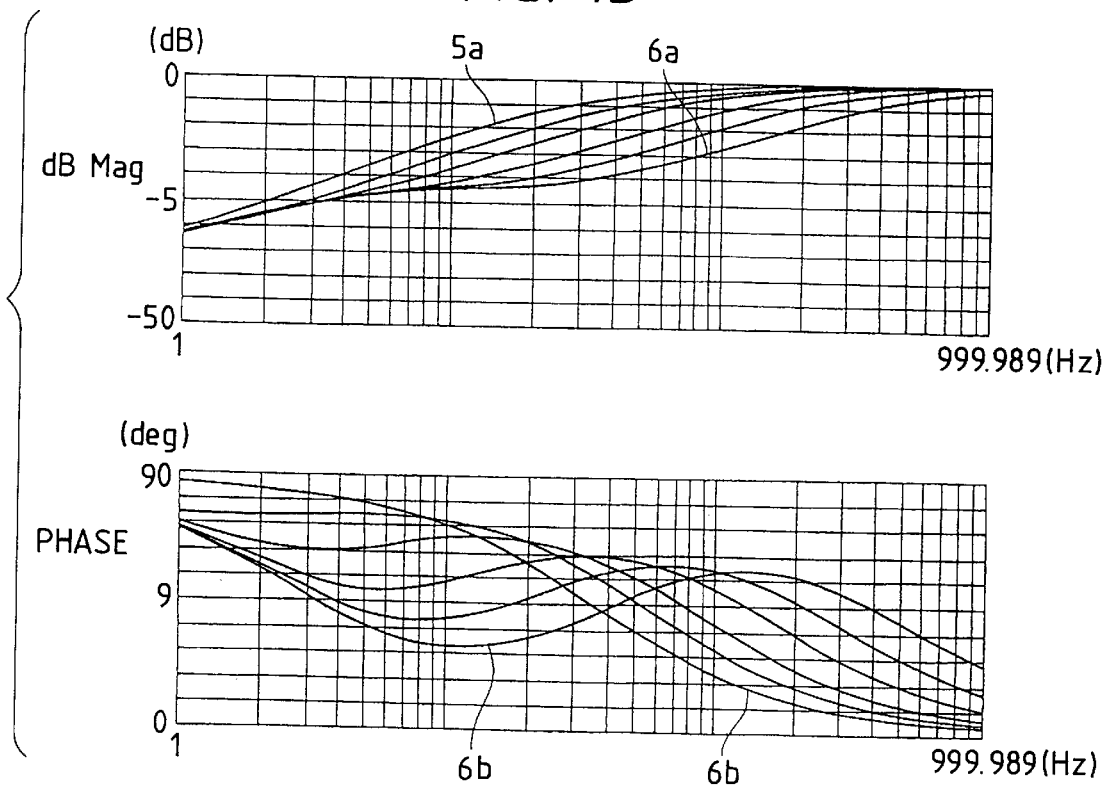
FIG. 13 is a wave form chart showing results of measurement of the frequency characteristics of the filter circuit shown in FIG. 12.

FIG. 13 shows the measured results of the frequency characteristics of the circuit in FIG. 12. However, for reducing the time of measurement, the measurement is made by increasing the frequency range by 100 times, by reducing the capacitor C11 to $1/100$ of the actual capacity. Consequently, the actual characteristics can be obtained by decreasing, to $1/100$, the frequency in FIG. 13, so that FIG. 12 indicates the characteristics of 0.1 to 10 Hz.

The embodiment explained above has the following effects.

Firstly, the control means (absolute value circuit 16 and function circuit 18) can attain the desired behavior without the delay element. More specifically, a prompt control is possible on the variation of the characteristics of the filter circuit, so that the recovery from the deterioration of the correcting characteristics, resulting from the panning operation, can be completed within a minimum time after the end of the panning operation.

Secondly, the phase characteristics of the filter circuit in the panning control vary in a direction to decrease the phase advancement, instead of to increase the phase advancement, so that the seasickness felt in the obtained image is extremely reduced.

Thirdly, the use of an analog circuit reduces the undesirable influence of the input offset voltage/current of the amplifier on the variable control of the characteristics of the filter circuit, through elimination of the DC-like change.

Fourthly, the characteristics control of the filter circuit, being achievable with a simple function, can be realized by a simple analog circuit, without an intelligent device such as a microcomputer. Also the filter circuit itself can be composed of an extremely simple structure. Consequently the system can be made less expensive in the circuit structure, in comparison with the system utilizing the microcomputer. Also there can be achieved saving of the power consumption, and the radiation of the unnecessary electromagnetic wave can be extremely reduced.

The above-explained embodiment is applicable, not only to the image-taking apparatus such as the still camera or the movie camera, but also to any apparatus that is manually held to effect certain operation for an object, where it is desirable to relax the influence of the small vibrations (hand shaking) generated as a result of such operation. In such operation, the apparatus subjected to a movement based on the intention of the operator to aim the apparatus at the object and to another movement eventually generated against such intention, but the present vibration correcting device is to suppress the latter movement and transmit the former movement only.

More specifically it is applicable, in addition to the image-taking apparatus mentioned above, to an observation apparatus such as a scope and an illumination apparatus used for presentation such as a laser pointer, for the purpose of stabilizing the phototaking image, observed image, irradiated position or illuminated position.

It is also possible to relax, not only the vibration resulting from a human operation, but also an unsmooth movement in a machine operation, by suitably changing the setting of the frequency and the threshold values. For example it is applicable to an apparatus for smoothing the movement of the hands of a robot or an apparatus for relaxing the vibration of an automobile in the running.

Also the detection means can be composed of a position sensor, a velocity sensor, an acceleration sensor, a direction sensor, an angular velocity sensor or an angular acceleration sensor.

Also for the correction means, there can be employed, not only the method of varying the vertical angle of the prism, but also a method of shifting or rotating a lens in a direction perpendicular to the optical axis, a method of shifting an image sensor in a direction perpendicular to the optical axis, or a method of electronically varying the image cut-out area of the image taking area.

As explained in the foregoing, the present embodiment is provided with limiting means which is controlled at a first state in a first input state of the correction means and at a second state in a second input state of the correction means, wherein, in the second state, the gain in a range between a first frequency and a higher second frequency is lowered while the gain below the first frequency is not substantially varied (may be made slightly lower or higher), in comparison with the first state.

Also the control means for controlling the limiting means is so constructed as to determine an absolute value from the input value of the correction means and to control the state of the limiting means as a function of the absolute value (i.e. without a time delay factor related to the return of the limiting means from the second state to the first state).

Such control means without the delay element enables the device to realize satisfactory behavior at the end of the panning operation.

In the following there will be explained a third embodiment of the present invention, which provides further improvement in the characteristics over the foregoing first and second embodiments.

Figure 14:
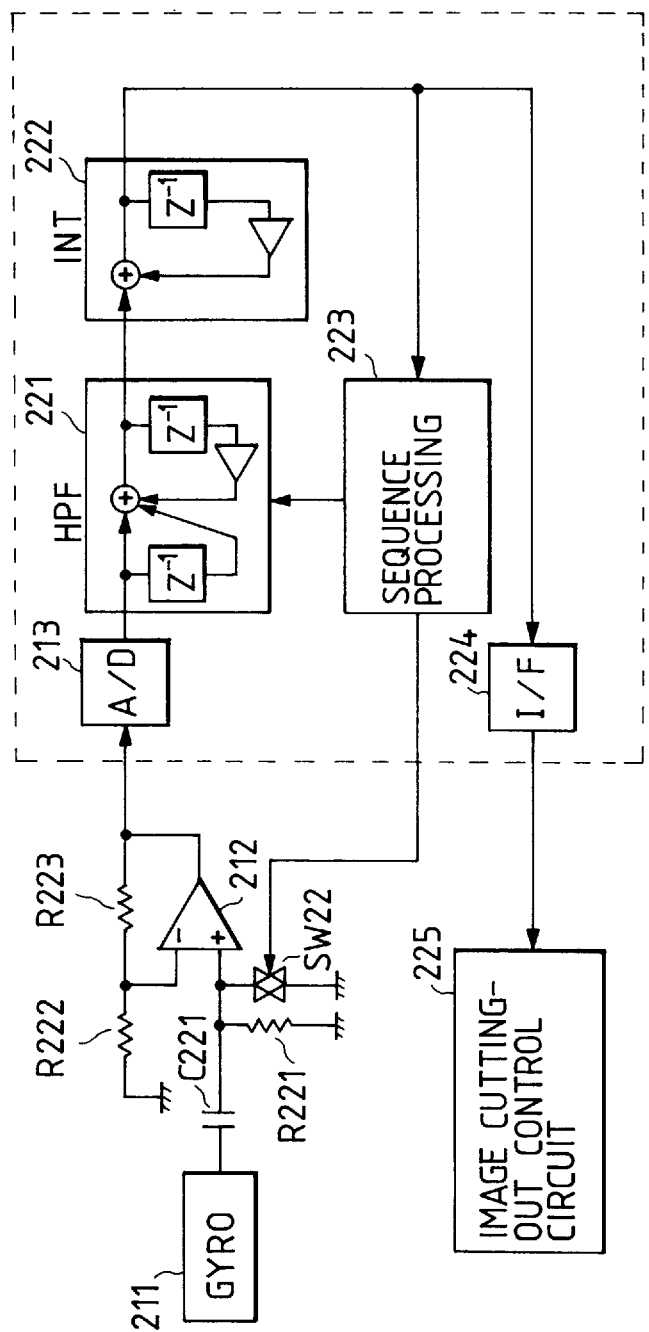
FIGS. 14 and 15 are block diagrams showing examples of the vibration correcting device.

FIG. 14 is a view showing a vibration correcting device, applied for example to a video movie camera. Detection means 211 for detecting the state of vibration of a hand-held operation apparatus such as a camera (not shown) detects the angular velocity of the movement of the apparatus, by means for example of a gyro sensor. The angular velocity signal obtained from the sensor is subjected to the cutting of DC component by a low-cut filter composed of a capacitor C221 and a resistor R221, then supplied to the positive input terminal of an operational amplifier 212 and amplified therein with a gain set by resistors R222.

Thus amplified sensor output is converted by an A/D converting circuit 213 into a digital signal, and is thereafter processed in digital manner.

At first the output of the A/D converter 213 is supplied, through a low-cut filter 221 with a variable cut-off frequency, to an integration circuit 222, in which the limited angular velocity signal is converted into an angle signal. The output of the integration circuit 222 is subjected to the evaluation of amplitude in sequence process means 223, for suitably controlling the cut-off frequency of the low-cut filter means 221, and is also supplied to an image cut-out control circuit 225, through an interface 224, thereby determining the cut-out position of the taken image and effecting the correction of vibration. In an initialization process for example at the start of power supply, the sequence process means 223 closes an analog switch SW22 thereby setting the change of the capacitor C221 at a stationary state.

Figure 15:
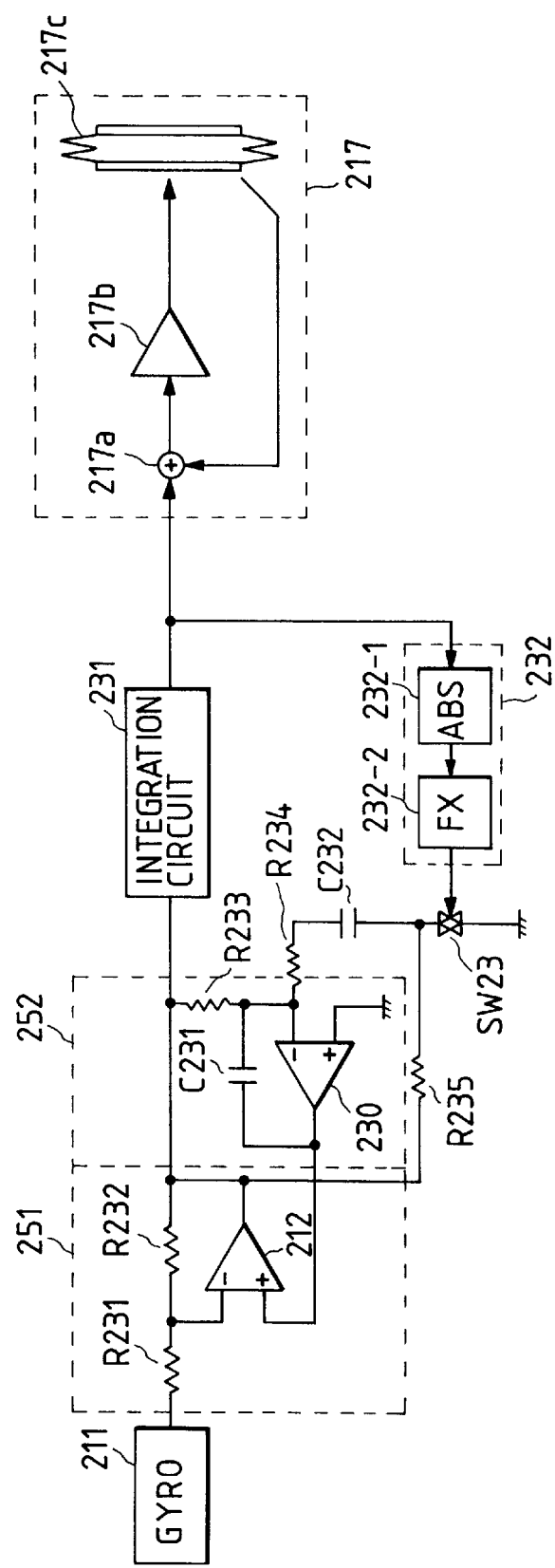

FIG. 15 is a view showing another example of the vibration correcting device applied to a movie camera.

In FIG. 15, an operational amplifier 212 and resistors R231, R232 constitute an inverted amplifier circuit 251. An operational amplifier 230, a resistor R233 and a capacitor C231 constitute an integration circuit 252, which serves to stabilize the average DC voltage of the output of the inverted amplifier circuit 251 to a reference voltage (ground level in the illustrated circuit) by a feedback circuit composed of the operational amplifiers 212 and 230. The angular velocity signal, supplied from the gyro sensor and representing the angular velocity of the movement of the apparatus, is amplified in the amplifier 212 with a predetermined gain set by the resistors R231 and R232.

The integration circuit 231 converts the angular velocity signal, supplied through the amplifier 212, into an angle signal. The output of the integration circuit 231 is supplied to correction means 217 and also to a limiting circuit 232, composed of an absolute value circuit 232-1 and a function circuit 232-2, thereby controlling the characteristics of the limiting circuit 232.

When an analog switch SW23 is turned on by the output of the limiting circuit 232, resistors R234, R235 and a capacitor C232 become ineffective and there are obtained characteristics of a first-order high-pass filter. On the other hand, when the analog switch SW23 is turned off, the effect of the resistors R234, R235 and the capacitor C232 is added thereby realizing characteristics difficult to saturate even in the panning operation. Thus the frequency characteristics can be varied continuously, by controlling the function of the analog switch SW23 with a square wave signal with a continuously varying duty ratio, obtained from the limiting circuit 232.

The functions of a differential circuit 217a, a drive circuit 217b and a variable angle prism 217c in the correcting means 217 will not be explained further.

The conventional vibration correcting device, constructed as explained above, requires a capacitor of a large capacity for cutting the DC component, and is therefore disadvantageous in cost and in the device volume. Also in the electrical characteristics, the leak current of the capacitor is unnegligibly large, so that certain correction means or filter means for compensating for such leak current is indispensable.

The object of the present embodiment is to resolve the drawback mentioned above and is to provide a vibration correcting device capable of dispensing with the capacitor.

Another object is to provide an optical apparatus equipped with the above-mentioned vibration correcting device.

Still another object is to provide a camera equipped with the above-mentioned vibration correcting device.

The foregoing objects can be attained, according to the present embodiment, by a vibration correcting device provided with detection means for detecting the state of the device and generating an analog signal representing the detected state, amplifier means for amplifying the output of the detection means with a predetermined gain, A/D conversion means for converting the output of the amplifier means into a digital signal, signal processing means adapted to vary first and second values according to the output of the A/D conversion means and means for functioning according to the first value of the signal processing means, the device comprising D/A conversion means for converting the second value which is a digital signal into an analog signal, and controlling the function point of the amplifier means by the analog signal after conversion, whereby the vibration correcting device is realized with a low cost and stable performance, without a capacitor in the analog portion and with minimum digital processing.

Figure 16:
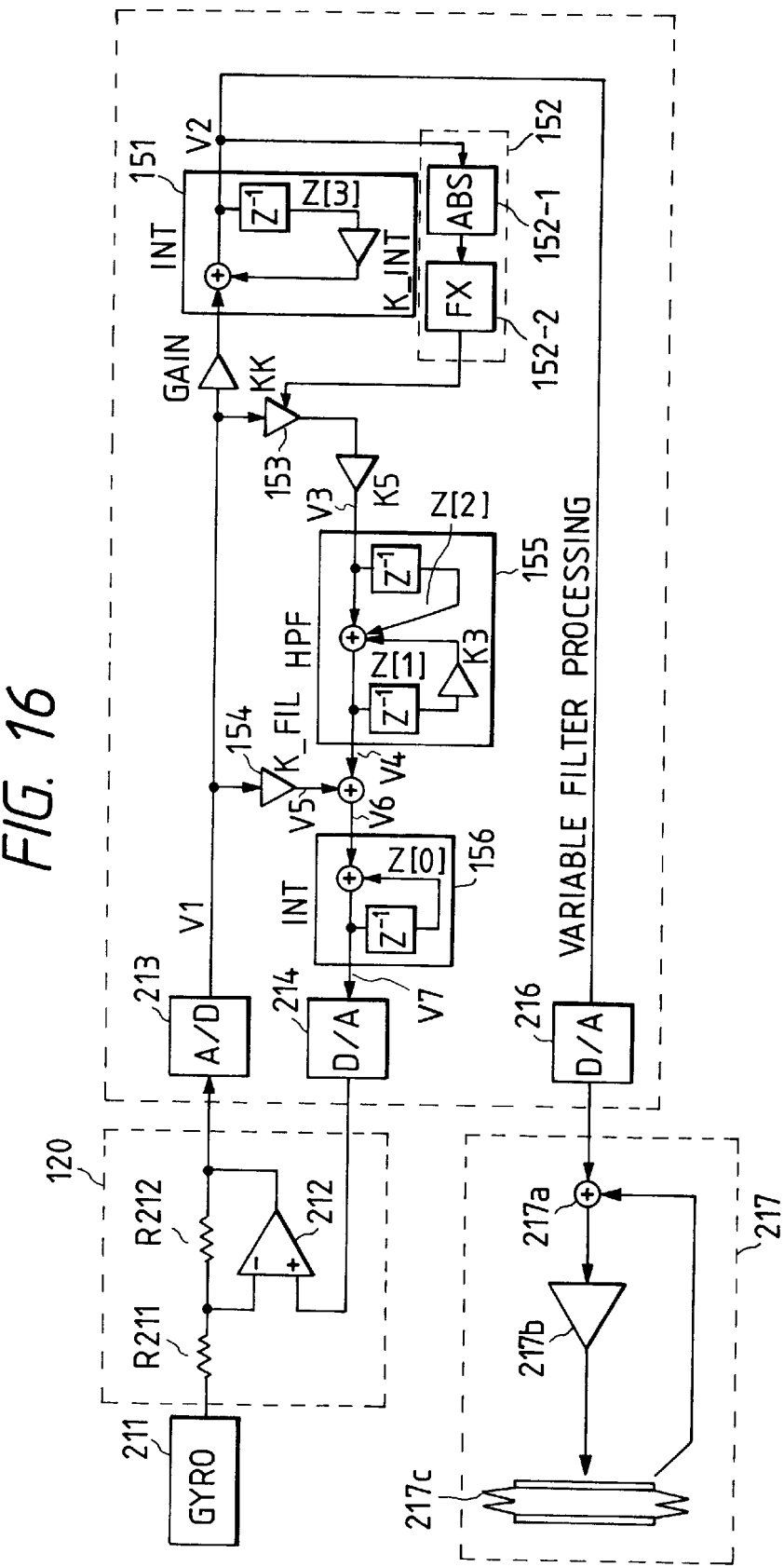
FIG. 16 is a block diagram showing configuration of a vibration correcting device constituting a third embodiment of the present invention.

FIG. 16 is a block diagram of a vibration correcting device best representing the feature of the fourth embodiment. A gyro sensor 211, serving as detection means for detecting the angular velocity of an unrepresented hand-held operation apparatus such as an optical apparatus or a camera, generates an angular velocity signal, which is amplified, in amplifier 212 in amplifier means 120 with a predetermined gain set by resistors R211 and R212. The amplified angular velocity signal is converted by an A/D conversion circuit 213 into a digital value V1, which is subsequently used in three digital processes.

The amplifier means 120 is composed of an operational amplifier 212 and two resistors R211, R212. An end of the resistor R211 is connected to the output terminal of the detection means 211; the other end of the resistor R211 and an end of the other resistor R212 are connected to the negative input terminal of the operation amplifier 212; the other end of the other resistor R212 and the input terminal of the A/D conversion means 213 are connected to the output terminal of the operational amplifier 212; and the output terminal of the D/A conversion means 214 is connected to the positive input terminal of the operational amplifier 212.

At first the digital value VI is supplied to integration means 151, in which it is integrated and converted into an angle signal. The integration means 151 has a property of attenuation with a predetermined time constant, thus in fact constituting a low-pass filter with a considerably low cut-off frequency. The output V2 of the integration means 151 is converted by a D/A conversion circuit 216 into an analog signal, which is transmitted to an optical system correction means 217 for achieving optical correction of the vibration. The output V2 is also supplied to a limiting circuit 232, composed of an absolute value circuit 512-1 and a function circuit 152-2, and is converted into a gain setting value (KK), which controls a variable-gain amplifier circuit 153, for varying the amplification gain within a range from 0 to 1 according to the digital value V1. The limiting means 512 selects the set gain value from minimum to maximum, according to a predetermined function, by taking the absolute value of the output V2.

The above-mentioned digital value V1 is secondly supplied to the variable-gain amplifier means 153, of which output is multiplied by a constant gain K5 and is supplied to a high-pass filter 155 to obtain an output V4. The digital value V1 is thirdly supplied to a predetermined-gain amplifier circuit 154, in which the digital value is amplified by K_FIL times to provide an output V5 which is added with the output V4 and integrated in integration means 156.

The output V7 of the integration means 156 is again converted, by a D/A conversion circuit 214, into an analog signal, which is supplied to the positive input terminal of the amplifier circuit 212.

In the following there will be explained the process function from the A/D conversion to the D/A conversion.

A first-order low-pass filter is constituted by the amplifier circuit 120 composed of the operational amplifier 212 and the resistors R11, R12, the predetermined-gain amplifier circuit 154 and the integration means 156. By means of the filter, the gyro sensor output which is unstable in the DC component is supplied, as a signal varying around a predetermined potential and subjected to necessary amplification, to the A/D conversion.

When the system requires initialization, for example at the start of power supply, the gain of the predetermined-gain amplifier circuit 154 is set at a large value for a necessary period, whereby the system can be promptly set at a stable state.

When the angle of the device is changed significantly, as in a panning operation, the output V2 of the integration means 151 tends to deviate significantly from the center value. The limiting means 152 detects such deviation and increases the gain of the variable-gain amplifier means 153.

The above-explained process from the A/D conversion to the D/A conversion may be realized by a hardware logic circuit, or by a computer program, of which an example is shown below as the fifth embodiment of the present invention.

The following program is written with the C language, and describes the digital process portion only, with variables corresponding to the values shown in FIG. 16.

The constants correspond to a case with a sampling frequency of ca. 500 Hz, a gyro sensitivity of ca. 1 mV/deg/sec, an amplifier gain of ca. 45 times, and an optical correction amount of ca. 1 deg/V in the correction system, with variables measured in volts:

```
{
    #define GAIN      0.07
    #define K_FIL    -0.0003
    #define K3        0.995
    #define K_INT     0.9999
    #define K5       -0.002
    float V1, V2, V3, V4, V5, V6, V7:
    float KK;
    float z[4];
        V2=V1xGAIN+z[3]xK_INT;
        KK=V2;
        if(KK<0.0)KK=-KK;      // abs. value
        KK=-0.75+(KKx2.5);
        if(KK<0.0)KK=0.0;
        if(KK<1.0)KK=1.0;      // function
        V3=V1xKKxK5;
```

-continued

```
V4=V3-z[2]+z[1]x3;
V5=V1xK_FIL;
V6=V4+V5;
V7=V5+z[0];
z[0]=V6;z[1]=V4;z[2]=V3;z[3]=V2;
}
```

The initialization, for example at the start of power supply, can be realized by setting the constant K_FIL at a larger absolute value and repeating the process by a predetermined number of times, and the ON/OFF drive can be realized by switching the constant GAIN at 0.

Figure 17:
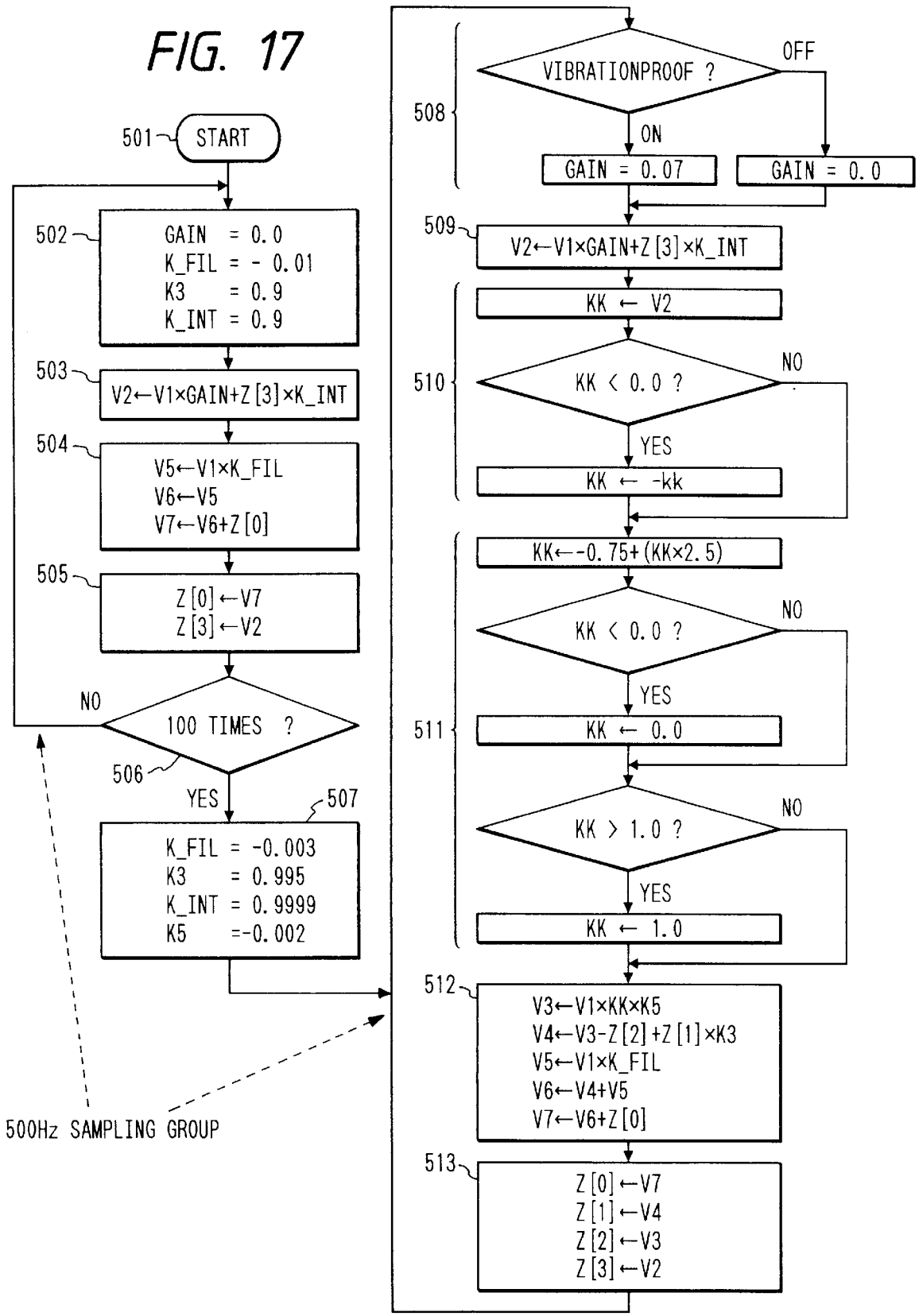
FIG. 17 is a flow chart showing the control sequence of a vibration correcting device constituting a fourth embodiment of the present invention.

The above-mentioned process will be explained with reference to a flow chart in FIG. 17. The system starts function by the start of power supply (501). The initial setting of the entire system, including the hardware is executed in a process loop of steps 502 to 506. At first a step 502 sets constants so as to facilitate convergence of the variables. A step 503 effects calculation from the A/D input to the D/A output of the D/A conversion circuit 216, then a step 504 effects calculation from the A/D input to the D/A output of the D/A conversion circuit 214, and a step 505 effects renewal of the delay element.

The constant K_FIL is set with an absolute value larger than in the ordinary state, thereby converging the feedback loop, including the analog amplifier 212, promptly to the stable state. In this embodiment the number of loops is set at 100, so that the stable state is reached in about 0.2 seconds.

After the initial setting, a step 507 sets the constants for the ordinary function state, and the infinite loop for 500 Hz sampling is started. At first a step 508 checks the ON/OFF state of an antivibration switch, and sets the GAIN at a suitable value or at 0 respectively in case of ON or OFF. A step 509 effects calculation from the A/D input to the D/A output of the D/A conversion circuit 216.

Figure 18:
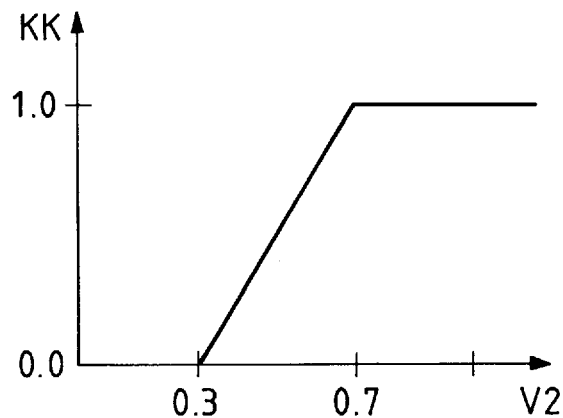
FIG. 18 is a chart of a function indicating the magnitude of a panning process.

A step 510 obtains the absolute value of the integrated output, and a step 511 effects a process with a function consisting of straight line portions. The steps 510 and 511 effect the conversion shown in FIG. 18. The set gain value KK represents the magnitude of the panning control. A step 512 effects calculation from the A/D input to the D/A output of the D/A conversion circuit 214, in which the set gain value KK mentioned above is involved. A step 153 updates the delay element.

The foregoing steps constitute a sampling process, and the sequence then waits until the start of a next sampling process.

The present system can realize all the processes, including the panning process, with an extremely simple program as explained above, so that an inexpensive microcomputer can be used for this purpose. Also if the apparatus has the microcomputer, A/D converter, D/A converter etc. for other purposes (for example, in case of a video camera, there are a high-performance microcomputer for auto focusing and multi-input A/D converter and multi-output D/A converter for various purposes), the surplus capacity of these devices may be utilized. Thus the control unit of the vibration correcting system can be realized almost without an increase in the cost.

Figure 19A:
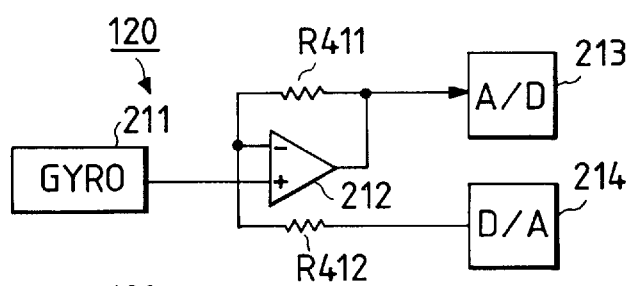
FIGS. 19A to 19C are block diagrams showing examples of the amplification means employed in the third embodiment of the present invention.
Figure 19B:
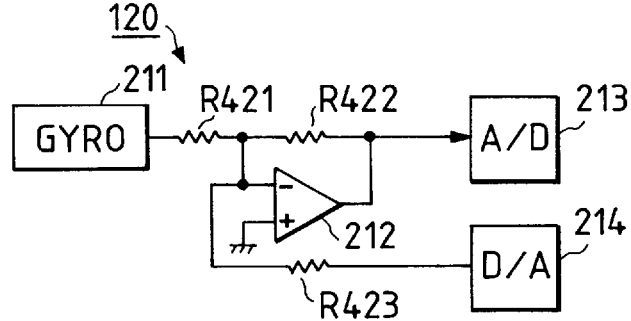
Figure 19C:
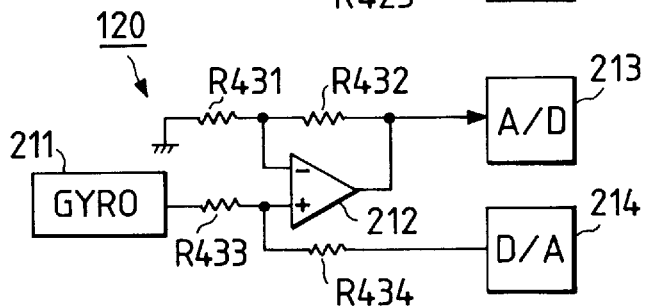

FIGS. 19A to 19C show examples of the configuration of the amplifier means 120 as the sixth embodiment of the present invention. In FIG. 19A, it is composed of an operational amplifier 212 and two resistors R411, R412. An end of the resistor R412 is connected to the output terminal of the operational amplifier 212; the other end of the resistor R412 and an end of the other resistor R411 are connected to the output terminal of D/A conversion means 214; the other end of the resistor R411 and the input terminal of the A/D conversion means 213 are connected to the output terminal of the operational amplifier 212; and the output terminal of detection means 211 is connected to the positive input terminal of the operational amplifier 212.

In FIG. 19B, the amplifier means 120 is composed of an operational amplifier 212 and three resistors R421, R422, R423. An end of the resistor R421 is connected to the output terminal of detection means 211; the other end of the resistor and ends of other resistors R422, R423 are connected to the negative input terminal of the operational amplifier 212; the other end of the resistor R422 and the input terminal of A/D conversion means 213 are connected to the output terminal of the operational amplifier 212; the other end of the resistor R423 is connected to the output terminal of D/A conversion means 214; and the positive input terminal of the operational amplifier 212 is connected to a predetermined potential.

In FIG. 19C, the amplifier means 120 is composed of an operational amplifier 212 and four resistors R431 to R434. An end of the resistor R431 is connected to a predetermined potential; the other end of the resistor and an end of the resistor R432 are connected to the negative input terminal of the operational amplifier 212; the other end of the resistor R432 and the input terminal of A/D conversion means 213 are connected to the output terminal of the operational amplifier 212; an end of the resistor R433 is connected to the output terminal of detection means 211; the other end of the resistor and an end of the resistor R434 are connected to the positive input terminal of the operational amplifier 212; and the other end of the resistor R434 is connected to the output terminal of D/A conversion means 214.

The embodiment explained above can provide following particular effects:

(1) The embodiment can exclude all the capacitors of large capacity, which have been required for cutting the DC component or for realizing a large time constant, thereby being advantageous in cost and in the device volume;

(2) The time constant control is achieved in digital manner, thereby significantly reducing the time required for initialization, for example at the start of power supply;

(3) A limitation on the large-amplitude input is already applied at the input to the A/D converter, thereby allowing to reduce the dynamic range or effective bit number of the A/D conversion;

(4) As the capacitors are eliminated, the leak current thereof is also eliminated. Consequently there can be dispensed with the adjusting or correcting means for compensating the DC offset, resulting from the offset voltage of the operational amplifiers.

Also there can be obtained an optical apparatus, equipped with the vibration correction device showing the above-mentioned effects.

Furthermore, there can be obtained a camera equipped with the vibration correction device showing the above-mentioned effects.

In the following there will be explained a seventh embodiment of the present invention, which constitutes an improvement over the foregoing fifth and sixth embodiments.

Figure 20:
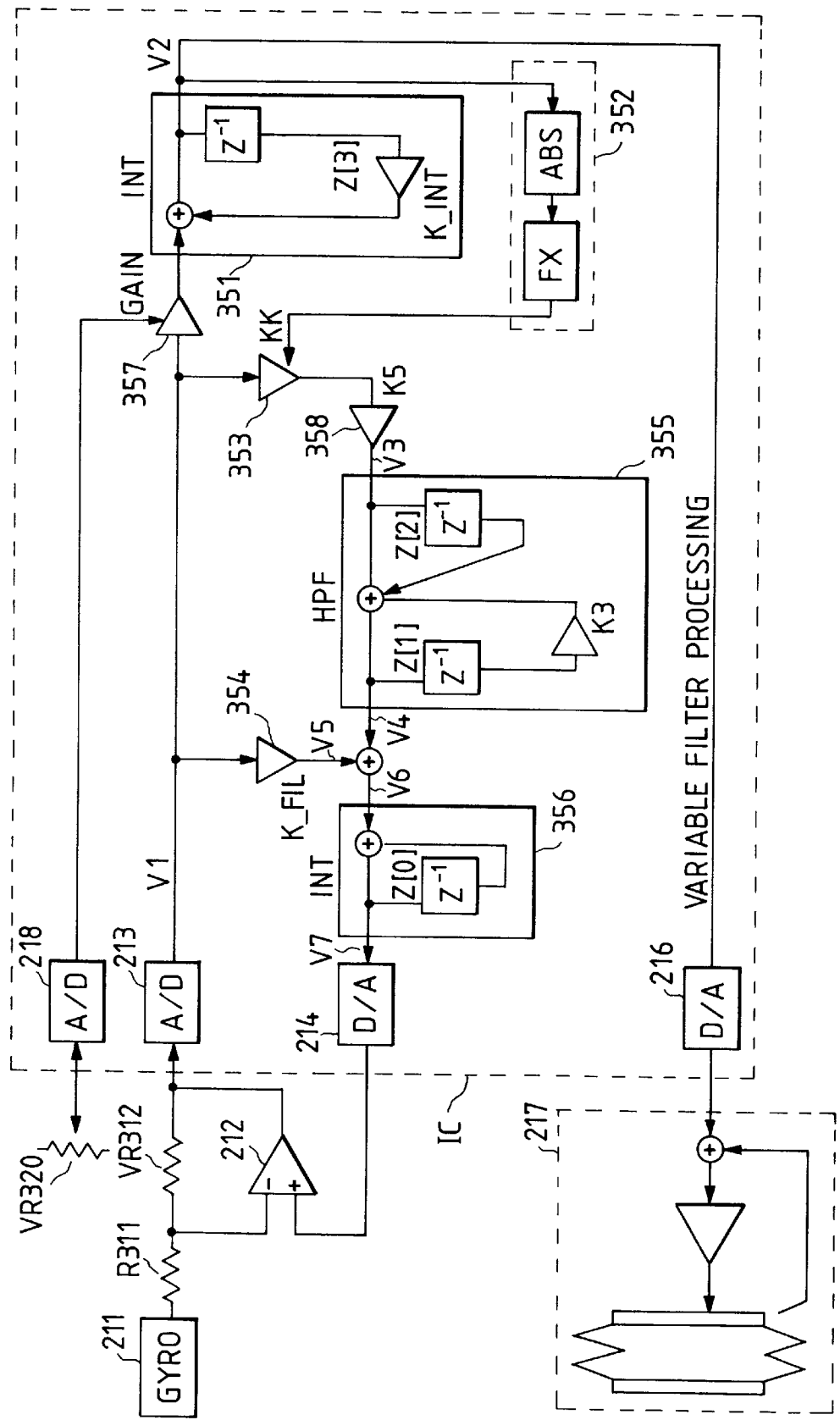
FIG. 20 is a block diagram showing an example of the vibration correcting device.

At first reference is made to FIG. 20, showing a configuration corresponding to the foregoing embodiment, applied to the vibration correcting system in a movie camera.

A gyro sensor 211, constituting detection means, detects the angular velocity of the movement of the device. An angular velocity signal from the gyro sensor 211 is amplified in an operational amplifier 212 with a predetermined gain set by resistors R311, R312. The amplified angular velocity signal is converted, in an A/D conversion circuit 213, into a digital output V1, which is subsequently used in three digital processes.

The output V1 is firstly supplied to multiplication means 357 (GAIN), which constitutes adjustment means for correcting the fluctuation in the sensitivity of the gyro sensor 211 and effects a multiplication by a value, obtained by converting an adjustment value of an external variable resistor VR320 by an A/D conversion circuit 218. The angular velocity signal, adjusted to constant sensitivity characteristics by the adjustment means, is integrated by integration means 351 to provide an angle signal. The integration means, being provided with a property of attenuation with a predetermined time constant, in fact constitutes a low-pass filter of a considerably low cut-off frequency.

The output V2 of the integration means 351 is converted in a D/A conversion circuit 216 into an analog signal, which is transmitted to optical system correction means 217 for effecting optical correction of the vibration. It is also transmitted to control means 352 for conversion into a set gain value KK. The control means 352 selects the set gain value within a range from a minimum value to a maximum value according to a predetermined function, by taking the absolute value of the output V2.

The set gain value KK is supplied to a variable-gain amplifier circuit 353, whereby the amplification gain on the output V1 varies within a range from 0 to 1.

The output V1 is secondly supplied to the above-mentioned variable-gain amplifier means 353, of which output is multiplied in multiplication means 358 by a constant gain K5 and is supplied to a high-pass filter 355 to obtain an output V4.

The output V1 is thirdly supplied to the predetermined-gain amplifier circuit 354, in which the output V1 is multiplied by K_FIL times to provide V5 and is added with the output V4 to obtain an output V6, which is then integrated in integration means 356. The output V7 of the integration circuit 356 is converted again by D/A conversion circuit 214 into an analog signal which is added to the positive input terminal of an operational amplifier 212.

In the following there will be explained the process from the A/D conversion circuit 213 to the D/A conversion circuit 216, executed in an integrated circuit.

An amplifier circuit composed of the operational amplifier circuit 212 and the resistors R311, R312, the predetermined-gain amplifier circuit 254 and the integration circuit 356 constitute a first-order low-pass filter, by means of which the output of the gyro sensor 211, unstable in the DC component, is supplied as a signal varying around a predetermined potential and subjected to necessary amplification, to the A/D conversion circuit 213.

When the system requires initialization, as at the start of power supply, the gain of the predetermined-gain amplifier circuit 354 may be made larger only during a necessary period, whereby the system can be promptly set at the stationary state.

When the angle of the device is changed significantly, as in a panning operation, the output V2 of the integration means 351 tends to deviate significantly from the center value. The limiting means 352 detects such deviation and increases the gain of the variable-gain amplifier means 353.

The above-explained process from the A/D conversion circuit 213 to the D/A conversion circuit 216 may be realized by a hardware logic circuit, or by a computer program, of which an example is shown below.

The following program is written with the C language, and describes the digital process portion only, with variables corresponding to the values shown in FIG. 20.

The constants correspond to a case with a sampling frequency of ca. 500 Hz, a gyro sensitivity of ca. 1 mV/deg/sec, an amplifier gain of ca. 45 times, and an optical correction amount of ca. 1 deg/V in the correction system, with variables measured in volts:

```
{
    #define GAIN      0.07
    #define K_FIL    -0.0003
    #define K3        0.995
    #define K_INT     0.9999
    #define K5       -0.002
    float V1, V2, V3, V4, V5, V6, V7;
    float KK;
    float z[4];
        V2=V1xGAIN+z[3]xK_INT;
        KK=V2;
        if(KK<0.0)KK=KK;      // abs. value
        KK=-0.75+(KKx2.5);
        if(KK<0.0)KK=0.0;
        if(KK>1.0)KK=0.0;     // function
        V3=V1xKKxK5;
        V4=V3-z[2]+z[1]xK3;
        V5=V1xK_FIL;
        V6=V4+V5;
        V7=V5+z[0];
        z[0]=V6;z[1]=V4;z[2]=V3;z[3]=V2;
}
```

The initialization, for example at the start of power supply, can be realized by setting the constant K_FIL at a larger absolute value and repeating the process by a predetermined number of times, and the ON/OFF drive can be realized by switching the constant GAIN at 0.

Figure 21:
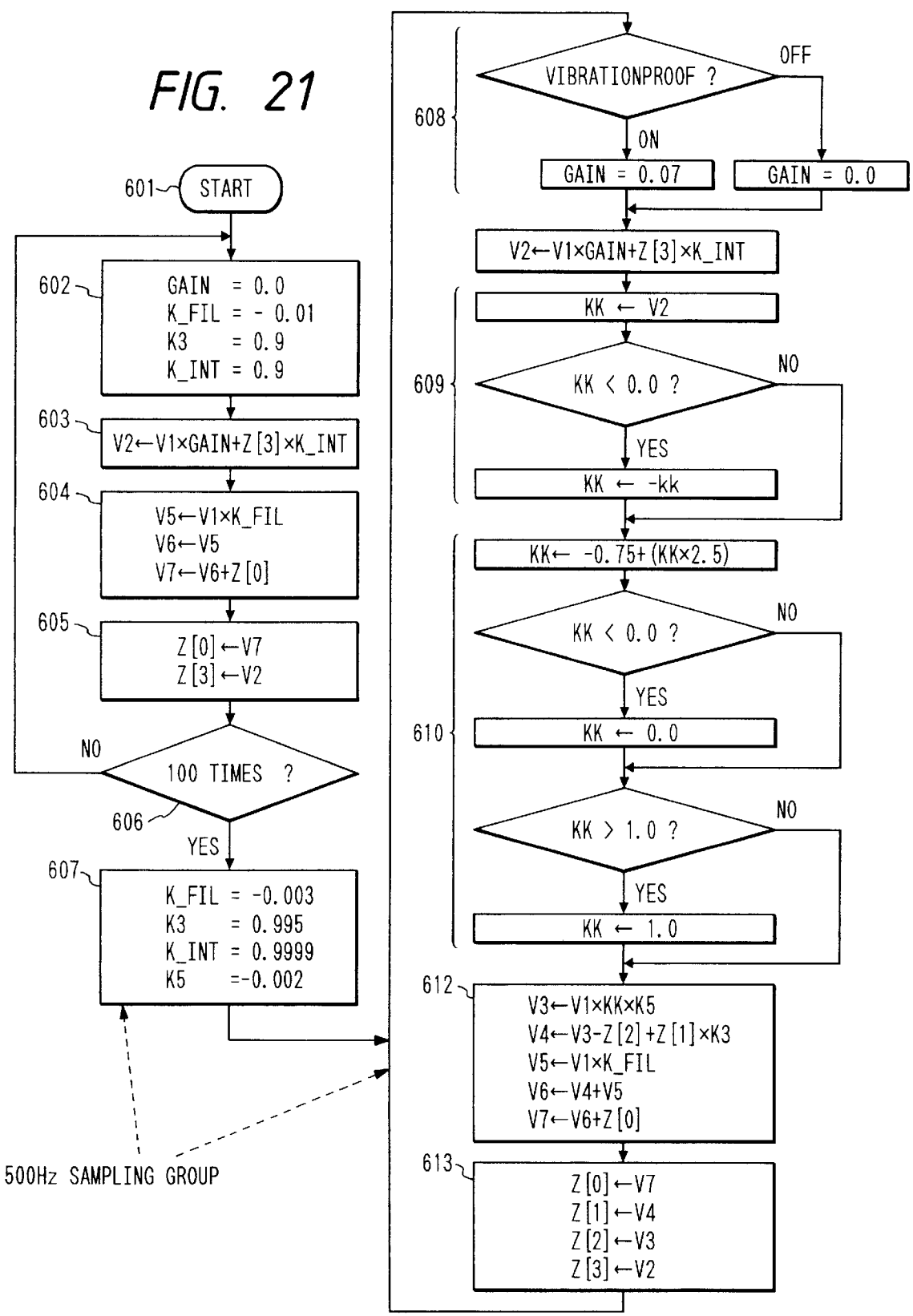
FIG. 21 is a flow chart showing a vibration correcting process.

The above-mentioned process will be explained with reference to a flow chart in FIG. 21.

The system starts function by the start of power supply (step 601).

At first, the initial setting of the entire system, including the hardware, is executed in a process loop of steps 602 to 606. A step 602 sets constants so as to facilitate convergence of the variables. A step 603 effects calculation from the input to the A/D conversion circuit 213 to the output from the D/A conversion 216, then a step 604 effects calculation from the input of the A/D conversion circuit 213 to the output from the D/A conversion circuit 214, and a step 605 effects updating of the delay element.

The constant K_FIL is set with an absolute value larger than in the ordinary state, thereby converging the feedback loop, including the operational amplifier circuit 212, promptly to the stable state. In this embodiment the number of loops is set at 100, so that the stable state is reached in about 0.2 seconds.

After the initial setting a step 607 sets the constants for the ordinary function state, and the infinite loop for 500 Hz sampling is started.

At first a step 608 checks the ON/OFF state of an antivibration switch, and sets the GAIN at a suitable value or at 0 respectively in case of ON or OFF.

A step 609 effects calculation from the input to the A/D conversion circuit 213 to the output from the D/A conversion circuit 216.

Figure 22:
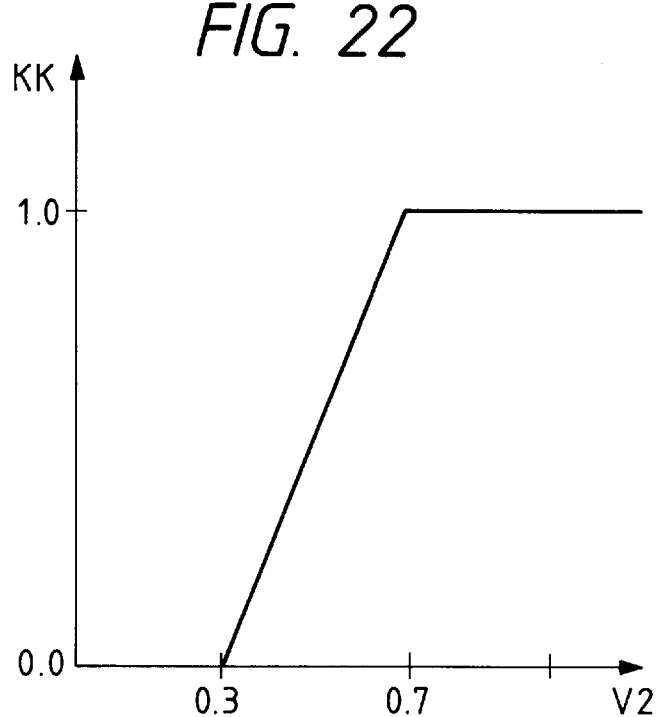
FIG. 22 is a chart showing a panning function.

A step 610 obtains the absolute value of the integrated output, and a step 611 effects a process with a function consisting of straight line portions. The steps 610 and 611 effect the conversion shown in FIG. 22. The value KK obtained represents the magnitude of the panning control.

A next step 612 effects calculation from the input to the A/D conversion circuit 213 to the output from the D/A conversion circuit 214, in which the above-mentioned value KK is involved.

A next step 613 updates the delay element.

The foregoing steps constitute a sampling process, and the sequence then waits until the start of a next sampling process.

The above-explained conventional example involves certain multiplication processes, which require considerable resources (which are multiplication circuits in case of a hardware process, or multiplication time in case of a software process).

As explained in the foregoing, the foregoing embodiments consume significant resources in the multiplication processes and have, therefore, a room for improvement.

Therefore, the object of the present embodiment is to provide a vibration correcting device capable of reducing the magnitude of circuit or achieving correction of vibration within a short time.

For attaining the above-mentioned object, the present embodiment is provided with signal process means for effecting all the multiplication processes by an arithmetic shift operation, whereby all the multiplication processes in the signal process means are replaced by the digital arithmetic shift operations.

Also the present embodiment is provided with gain adjustment means for adjusting the predetermined gain of the amplifier means, whereby the multiplication processes are effected by the gain adjustment means and the amplifier means and are excluded from the signal process means.

In the following the present embodiment will: be explained in detail, with reference to the attached drawings.

The present embodiment reconstructs the foregoing fifth and sixth embodiment, corresponding to the configuration shown in FIGS. 19A to 19C or disclosed in the Japanese Patent Application No. 6-309560 by adding two modifications of:

1) replacing the multiplication process with an arithmetic shift process; and 2) re placing the multiplication process with an analog circuit or the like positioned outside, thereby realizing a device completely free from the multiplication means.

More specifically, the targets of replacement in the configuration shown in FIGS. 19A to 19C are:

(1) multiplication of constant K_FIL;
(2) multiplication of constant K3;
(3) multiplication of constant K_INT;
(4) multiplication of constant a K5;
(5) multiplication of variable KK; and
(6) multiplication of variable GAIN.

Among the above-mentioned multiplications, (1) to (4) are executed with constants determined at the design stage, and the replacement can be achieved by a simple arithmetic shift process or a combination of an arithmetic shift process and a subtraction and by regarding the result as the multiplication with an approximate value.

The replacement for the multiplication (5) can be realized by switching the arithmetic shift processes with different constants, according to the output of control means 452 to be explained later.

The multiplication (6) cannot be simply replaced by an approximate value, as it requires a certain level of precision for gain adjustment.

Therefore, the replacement of this multiplication is achieved by employing a suitable scaling by the arithmetic shift process of a constant, and, for meeting the required precision, providing analog adjustment means outside the digital process unit. These replacements will be explained further in an embodiment, including specific numerical values.

Figure 23:
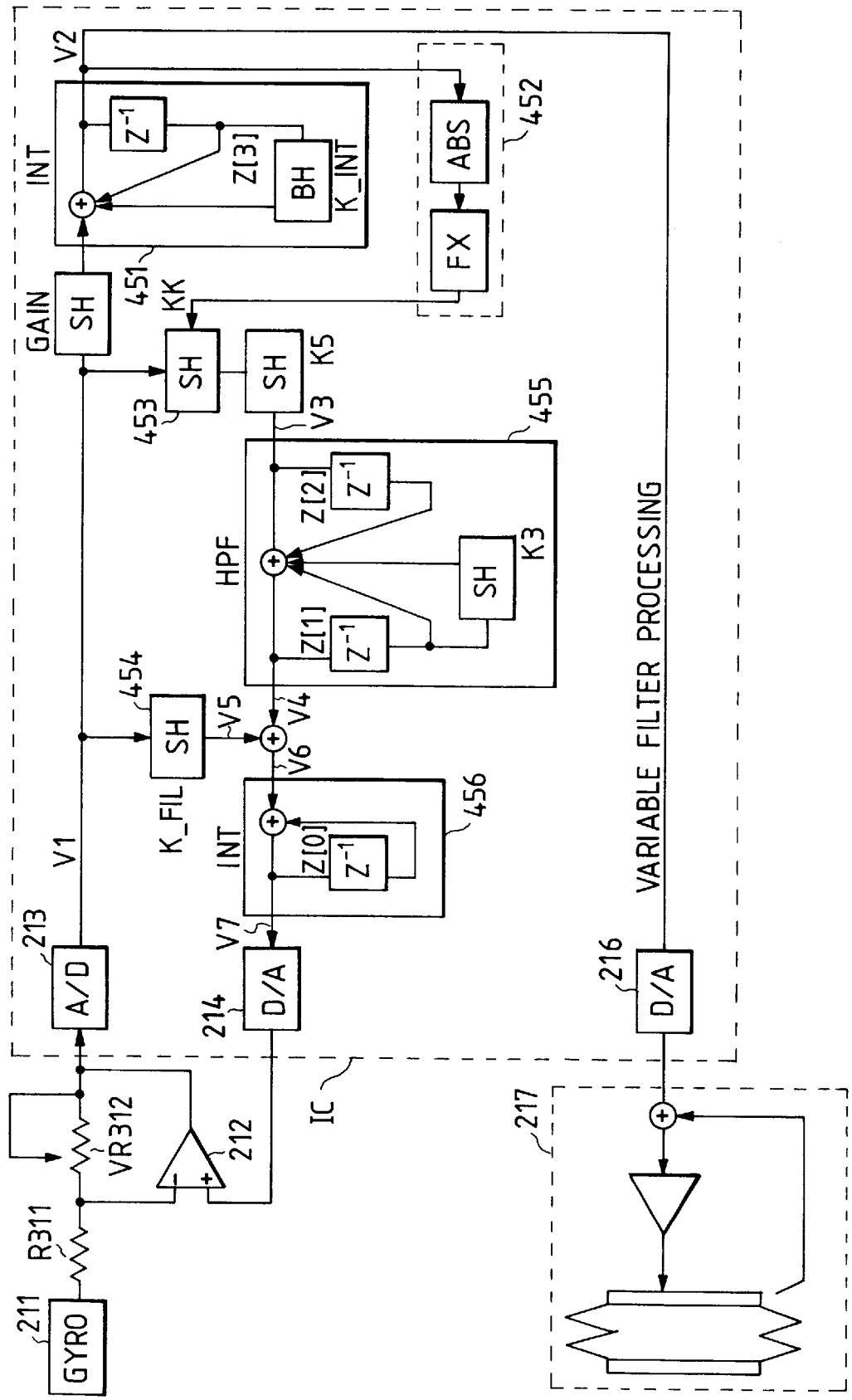
FIG. 23 is a block diagram showing schematic configuration of a vibration correcting device constituting a fifth embodiment of the present invention.

FIG. 23 is a block diagram showing the circuit configuration of a vibration correcting device constituting a eighth embodiment of the present invention, applied to a movie camera.

A gyro sensor 211, constituting detection means, detects the angular velocity of the movement of the device. An angular velocity signal, from the gyro sensor 211, is amplified in an operational amplifier circuit 212 with a predetermined gain set by a resistor R311 and a variable resistor VR312. The amplified angular velocity signal is converted by an A/D conversion circuit 213 into a digital output V1, which is subsequently used in three digital processes.

The output V1 is firstly supplied to integration means 451, in which the angular velocity signal is integrated and converted into an angle signal V2. The integration means, having the property of attenuation with a predetermined time constant, in fact constitutes a low-pass filter with a considerably low cut-off frequency.

This low-pass filter is realized, in the conventional art, by multiplying the output of a delayed input with a predetermined constant (K_INT=0.9999) an d adding the obtained result with the input. In the present embodiment, an equivalent function is obtained by a process:

input+delayed value of input−value obtained by 12-bit rightward arithmetic shift of delayed value of input.

The value corresponding to K_INT is, more precisely, "0.99976" instead of "0.9999", but the difference is not perceptible.

The output V2 of the integration means 451 is converted in a D/A conversion circuit 216 into an analog signal, which is transmitted to optical system correction means 217 for correcting the vibration in optical manner. The output V2 is also transmitted to control means 452 for conversion into a set gain value KK. The control means 452 selects the set gain Value within a range from a minimum value to a maximum value, by taking the absolute value of the output V2.

The set gain value KK controls gain switching means 453, thereby switching the gain for the output V1 in predetermined steps.

The output V1 is secondly supplied to the above-mentioned gain switching means 453, of which output is subjected to a scaling of a constant gain K5 and supplied to a high-pass filter 455 to obtain an output V4.

The multiplication of K5 is conducted, in the foregoing embodiments, with a constant "0.002", but, in the present embodiment, is conducted by a rightward arithmetic shift of 9 bits, corresponding more precisely to the multiplication with a constant "0.00195". Also in the filter 455, the foregoing embodiments conduct a multiplication with K3=0.995, but the present embodiment effects subtraction of the result of a rightward arithmetic shift of bits from 1, corresponding to a multiplication with a constant "0.996".

The output V1 is thirdly supplied to predetermined-gain amplifier means 454, in which it is amplified by K_FIL times by a scaling of a predetermined gain to obtain an output V5. It is then added with the above-mentioned output V4 to obtain an output V6, which is integrated by integration means 456.

The scaling in the predetermined-gain amplifier means 454 is, in the foregoing embodiments, a multiplication with a constant "0.0003", but the present embodiment effects a rightward arithmetic shift of 12 bits, corresponding to the multiplication of a constant "0.000244".

The output V7 of the integration means 456 is converted again by a D/A conversion circuit 214 into an analog signal, which is supplied to the positive input terminal of the operational amplifier circuit 212.

In any replacement of the multiplication explained above, the difference from the foregoing embodiments is so small and is not perceptible to the human being.

In the following there will be explained a process from the A/D conversion circuit 213 to the D/A conversion circuit 216, executed in an integrated circuit.

An amplifier circuit composed of the operational amplifier circuit 212, the resistor R11 and the variable resistor VR12, the predetermined-gain amplifier means 454 and the integration means 456 constitute a first-order high-pass filter, by means of which the output of the gyro sensor 11 unstable in the DC component can be supplied as a signal varying around a predetermined potential and subjected to necessary amplification to the A/D conversion circuit 213.

The cut-off frequency of the high-pass filter is dependent on the closed-loop gain of the amplification circuit, of which transmission characteristics are represented as follows:

i $H(s)=-G/(1+(1+G)/Ts)$ wherein G is the gain, and T is a time constant determined by the predetermined-gain amplifier means and the integration means. Thus the cut-off frequency varies in proportion to (1+G).

However, the gyro sensor for vibration detection has recently been improved in quality, and can be obtained with a fluctuation in sensitivity of ±5%. Consequently, if such gyro sensor is employed, the range of adjustment can be limited to 5%, so that the variation in the cut-off frequency can also be suppressed to 5%.

Such range is not a practical problem, in the vibration correcting system for a movie camera, as considered in the present invention.

Thus the present embodiment can realize the vibration correcting device with an extremely small circuit magnitude, suitable for circuit integration.

A ninth embodiment of the present embodiment provides a program for realizing the effects of the foregoing fifth embodiment with a computer.

The constants are similar to those in the foregoing embodiment, and will not, therefore, be explained further.

Figure 24:
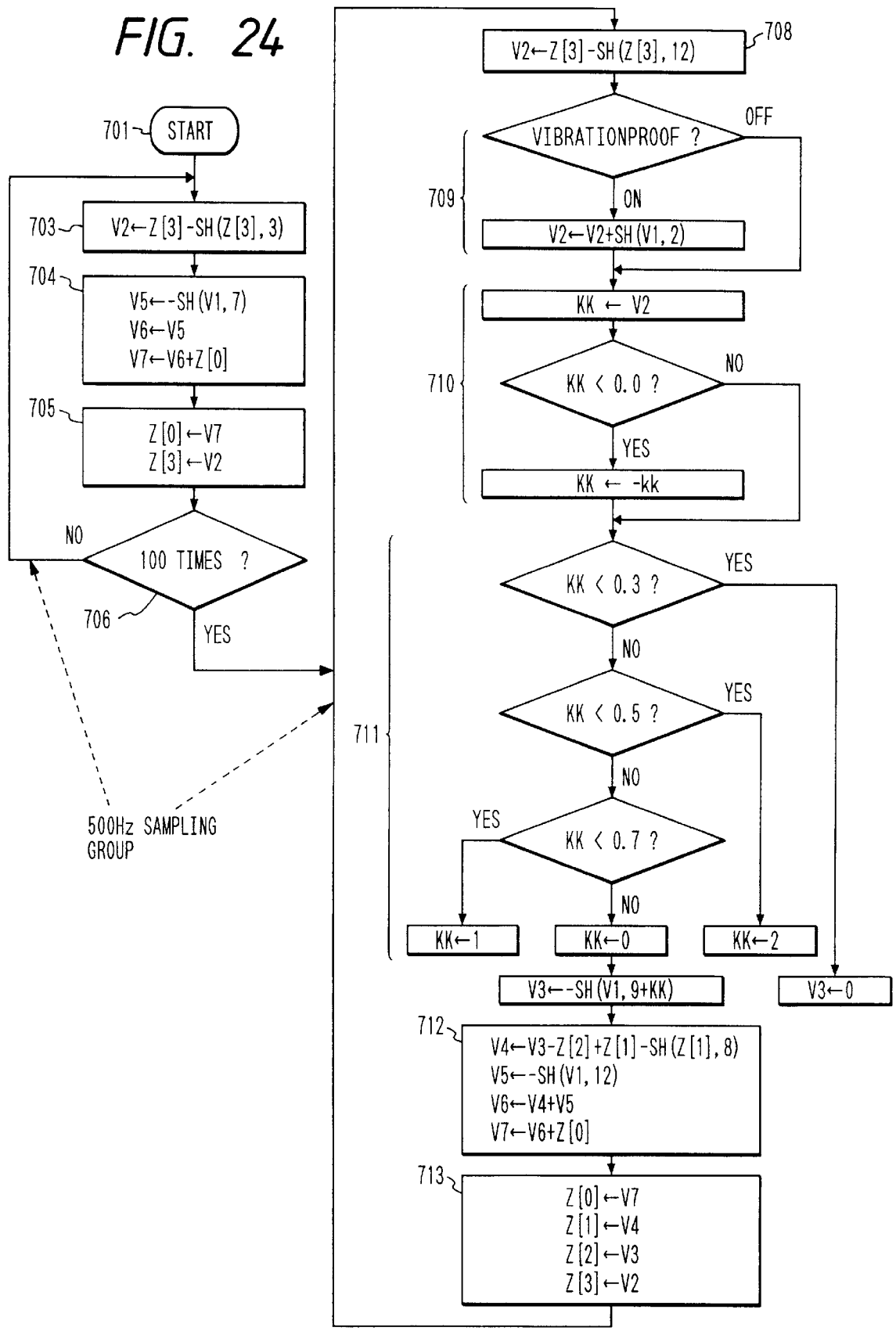
FIG. 24 is a flow chart showing a vibration correcting process of a device constituting a sixth embodiment of the present invention.

In the following, there is shown an abstract of a program written also by the C language, of which functions will be explained with reference to a flow chart in FIG. 24.

In this program, there is defined a rightward arithmetic shift function:

SH(val, shift)

which indicates a rightward shift of the input variable "val" by "shift" times:

```
{
double V1, V2, V3, V4, V5, V6, V7;
double KK;
double z[4];
    V2=z[3]-sh(z[3],2);
    V2=V2+sh(V1,2);
    KK=V2;
    KK=-KK;       // absolute value
```

-continued

```
if(KK<0.3)V3=0;
else {
    if(KK<0.5)KK=2;
    else {
        if(KK<0.7)KK=1;
        else KK=0;
    }
}
V3=sh(V1,9+KK);
}
V4=V3-z[2]+z[1]-sh(z[1],8);
V5=sh(V1,12);
V6=V4+V5;
V7=V5+z[0];
z[0]=V6;z[1]=V4;z[2]=V3;z[3]=V2;
}
```

In the following there will be explained the flow chart in FIG. 24.

After the system is started in a step 701, the entire system is initialized in a loop of steps 703 to 706.

A step 703 effects calculation from the input to the A/D conversion circuit 213 to the output from the D/A conversion circuit 216, then a step 704 effects calculation from the input to the A/D conversion circuit 213 to the output from the D/A conversion circuit 214, and a step 705 updates the delay element.

The shift amount in the step 703 is set at a value smaller than in the ordinary state, thereby converging the feedback loop including the amplifier 212 promptly to the stable state. In this embodiment the number of loops is set at 100, so that the stable state is reached in about 0.2 seconds.

After the initial setting, there is started the infinite loop of 500 Hz sampling.

At first a step 708 integrates the output of the D/A conversion circuit 216, then a step 709 checks the ON/OFF state of an antivibration switch, and, if ON, the input value from the A/D conversion circuit 213 is added, with a suitable scaling, to the output of the integration.

Figure 25:
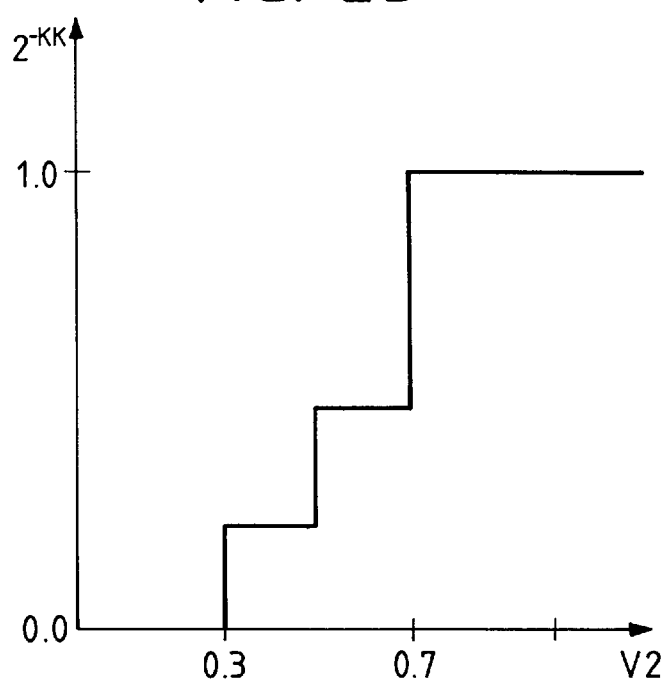
FIG. 25 is a chart showing a panning function in the fifth embodiment of the present invention.

Then a step 710 obtains the absolute value of the integrated output, and a step 711 effects a process by a function consisting of straight line portions. Thus the steps 710 and 711 effect the conversion shown in FIG. 25, and the value KK obtained therein represents the magnitude of the panning process. If the absolute value of the output V2 is equal to or less than 0.3, the output V3 is set at 0. If the absolute value exceeds 0.3, the shift amount on the output V1 is stepwise selected and set as the output V3.

A step 712 effects calculation of the process from the input to the A/D conversion circuit 213 to the output from the D/A conversion circuit 214, in which the output V3 determined above is involved.

A next step 713 updates the delay element.

The foregoing steps constitute a sampling process, and the sequence then waits until the start of a next sampling process.

The present embodiment can therefore provide a device capable of correcting the vibration within an extremely short time.

The foregoing embodiments replace all the multiplication processes with arithmetic shift process or variable-gain amplifier means realized by external analog circuits to exclude the multiplications processes from the digital process unit, thereby significantly reducing the magnitude of the circuits and realizing the vibration correcting system with a low cost. These facts are extremely advantageous for integration of the circuits.

The foregoing eighth and ninth embodiments provides configurations by a hardware and by a computer software, but the present invention is not limited to such embodiments and is likewise applicable to other various configurations.

Also the present invention has been explained by the application to a movie camera, but such application is not limitative and the present invention is likewise applicable to any apparatus manually held by a man for effecting a certain operation to an object, where it is desirable to relax the influence of small vibrations (such as hand shaking) eventually generated as a result of such operation.

The apparatus is generated subjected to a movement, based on the intention of the operator to aim the apparatus at the object, and another movement generated against such intention, and the device of the present invention suppresses the latter movement and only transmits the former movement.

More specifically it is applicable, not only to the movie camera explained in the foregoing, but also to other image-taking apparatus such as a still camera, an observation apparatus such as a scope, an illumination apparatus for presentation such as a laser pointer, for stabilizing the taken image, observed image, illumination position or irradiated position.

It is furthermore applicable, not only to the vibrations resulting from a human operation, but also to unsmooth movement of a machine. For example it can be used in a device for smoothing the movement of legs of a robot, or a device for relaxing the vibration of an automobile during running operation.

The detection means can be a velocity sensor, an angular velocity sensor or an angular acceleration sensor.

Also the correction means is not limited to the variable angle prism shown in FIG. 23 but can be of a type shifting or rotating a lens in a direction perpendicular to the optical axis, a type varying the reflecting angle of a mirror, or a type varying electronically a cut-out area of an image area.

The above-explained embodiments employ signal process means for effecting all the multiplication processes by arithmetic shift processes, thereby effecting all the multiplications in the signal process means by the digital arithmetic shift processes and excluding all the multiplications from the signal process means.

Also the embodiments employ gain adjustment means for adjusting the predetermined gain of the amplifier means, whereby the multiplications are excluded from the signal process means and executed by the gain adjustment means and the amplifier means.

Consequently, there can be provided a vibration correcting device capable of reducing the magnitude of circuits or achieving the correction of vibration within a short time.

The present invention is applicable, not only to the movie camera explained in the foregoing embodiments, but also to other image-taking apparatus such as a still camera, an observation apparatus such as a scope, or an illumination apparatus for present

What is claimed is:

1. A vibration correcting device comprising:

(a) movement detection means for detecting movement;

(b) correction means for correcting the movement;

(c) control means for controlling the drive of the correction means according to the movement detection information detected by the movement detection means; and (d) characteristics control means for varying frequency characteristics of the control means according to the function state of the correction means;

wherein the characteristics control means is adapted to vary the frequency characteristics of the control means in such a manner that when the correction means reaches a predetermined state, a gain of a predetermined frequency range of the control means is reduced to a predetermined level and a gain of a frequency lower than the predetermined frequency range is not substantially reduced.

2. A vibration correcting device according to claim 1, wherein the control means includes a high-pass filter, and the characteristics control means is adapted to vary the characteristics of the high-pass filter.

3. A vibration correcting device according to claim 1, wherein the characteristics control means is adapted to vary the frequency characteristics of the control means when the amount of correction thereby exceeds a predetermined value.

4. A vibration correcting device according to claim 3, wherein the predetermined state is a panning state.

5. A vibration correcting device according to claim 1, wherein the movement detection means is a gyro sensor.

6. A vibration correcting device according to claim 1, wherein the correction means is a prism with a variable vertical angle.

7. A vibration correcting device according to claim 4, wherein the characteristics control means is adapted to shift the cut-off frequency of the high-pass filter from a first frequency to a higher second frequency and to lower the gain in a range between the first and second frequencies only to a predetermined level.

8. A vibration correcting device comprising:

(a) movement detection means for detecting movement;

(b) extraction means for extracting a predetermined frequency component from the movement information detected by the movement detection means;

(c) movement correction means for correcting the movement based on the signal of the frequency component extracted by the extraction means;

(d) detection means for detecting a predetermined movement state; and (e) characteristics control means for varying the frequency characteristics of the extraction means when the predetermined movement state is detected by the detection means;

wherein the characteristics control means is adapted, when the predetermined movement state is detected, to lower the gain in a predetermined frequency range of the extraction means to a predetermined level but not to substantially lower the gain in a frequency lower than the predetermined frequency range.

9. A vibration correcting device according to claim 8, wherein the extraction means includes a high-pass filter, the characteristics control means is adapted to vary the characteristics of the high-pass filter.

10. A vibration correcting device according to claim 8, wherein the detection means is adapted to detect that the amount of correction by the movement correction means exceeds a predetermined value, and the characteristics control means is adapted to vary the frequency characteristics of the extraction means according to the result of detection by the detection means.

11. A vibration correcting device according to claim 10, wherein the predetermined state is a panning state.

12. A vibration correcting device according to claim 8, wherein the movement detection means is a gyro sensor, and the movement correction means is a prism with a variable vertical angle.

13. A vibration correcting device comprising:

(a) correction means for detecting and correcting a movement component; and (b) control means for varying the frequency characteristics of the correction means according to an operation state of the correction means, the control means being adapted to shift a cut-off frequency of the correction means to a predetermined frequency higher than that of a normal state of the correction means and to the shift a gain in the lower frequency side of the shifted cut-off frequency when the correction means is changed to a first state from the normal state.

14. A vibration correcting device according to claim 13, wherein the correction means includes a high-pass filter and the control means is adapted to vary the characteristics of the high-pass filter.

15. A vibration correcting device according to claim 13, wherein the control means is adapted to vary the frequency characteristics of the correction means when the amount of correction of the correction means exceeds a predetermined value.

16. A vibration correcting device according to claim 15, wherein the predetermined state is a panning state.

17. A vibration correcting device according to claim 16, wherein the correction means is adapted to correct the movement by detecting the movement with a gyro sensor and driving a variable angle prism.

18. A vibration correcting device comprising:

detection means for detecting the state of the device;

limiting means for performing a limitation of an output from the detection means;

correction means for functioning based on the output of the limiting means; and control means for varying the state of the limiting means according to the input value of the correction means, by controlling the limiting means to a first state or a second state respectively in a first or second input value state of the correction means, wherein, in the second state, said limiting means is controlled so that a gain of a range between a first frequency and a second frequency higher than the first frequency of said limiting means is reduced and the gain of a range below the first frequency is substantially not changed, in comparison with the first state.

19. A vibration correcting device according to claim 18, wherein the control means is adapted to determine the absolute value of the input value of the correction means and to control the state of the limiting means as a function of the absolute value.

20. A vibration correcting device according to claim 18, wherein the detection means is adapted to detect the position or direction of an apparatus on which the device is mounted, and is composed of a position sensor, a velocity sensor, a direction sensor, an angular velocity sensor or an angular acceleration sensor.

21. A vibration correcting device comprising:

angular velocity detection means for detecting the state of the device;

limiting means for performing a limitation of an output from the angular velocity detection means;

integration means for integrating the output of the limiting means;

correction means for functioning based on the output of the integration means; and control means for varying the state of the limiting means according to the input value of the correction means, by controlling the limiting means to a first state or a second state respectively in a first or second input value state of the correction means, wherein, in the second state, said limiting means is controlled so that a gain of a range between a first frequency and a second frequency higher than the first frequency is lowered and the gain of a range below the first frequency is substantially not changed, in comparison with the first state.

22. A vibration correcting device according to claim 21, wherein the first state is a state controlled to characteristics adapted to the stand-still state of the device, and the second state is a state controlled to characteristics adapted to a panning state.

23. A vibration correcting device comprising:

(a) movement detection means for detecting movement;

(b) correction means for correcting the detected movement;

(c) control means for controlling a drive of said correction means according to the movement detection information detected by said movement detection means; and (d) characteristics control means for varying frequency characteristics of said control means according to the function state of said correction means;

wherein said characteristics control means is adapted, when said correction means reaches a predetermined state, to reduce a gain in a predetermined frequency range of said control means to a predetermined level but to prevent the gain from being substantially reduced below the predetermined level.

24. A vibration correcting device comprising:

detection means for detecting an operational state of the device;

limiting means for limiting an output from said detection means;

correction means for performing functions in accordance with an output of said limiting means; and control means for varying a state of said limiting means according to an input value of said correction means, by controlling said limiting means between a first state and a second state, respectively, in accordance with a first or second input value of said correction means, wherein, in the second state, said control means controls said limiting means to cause a gain to be reduced in a range between a first frequency and a second frequency which is higher than the first frequency of said limiting means, but to cause the gain to be not substantially reduced below the first frequency.

* * * * *

UNITED STATES PATENT AND TRADEMARK OFFICE
CERTIFICATE OF CORRECTION

PATENT NO. : 5,805,212
DATED : September 8, 1998
INVENTOR(S) : AKIHIRO FUJIWARA, ET AL.

It is certified that error appears in the above-identified patent and that said Letters Patent is hereby corrected as shown below:

Column 1

Line 47, "detail" should read --detailed--.
    Line 49, "is" should read --are--.

Column 2

Line 32, "$f_{c,}$" should read --$f_c$--.

Column 13

Line 65, "In FIG. 19A, it" should read --FIG. 19A--.

Column 17

Line 31, "will:" should read --will--.
    Line 40, "re placing" should read --replacing--.

Column 18

Line 7, "a" (second occurrence) should read --an--.
    Line 26, "an d" should read --and--.
    Line 53, "is" should read --it is--.

UNITED STATES PATENT AND TRADEMARK OFFICE
CERTIFICATE OF CORRECTION

PATENT NO. : 5,805,212
DATED : September 8, 1998
INVENTOR(S) : AKIHIRO FUJIWARA, ET AL.

It is certified that error appears in the above-identified patent and that said Letters Patent is hereby corrected as shown below:

Column 19

Line 25, "iH(s)=-G/(1+(1+G)/Ts)" should read --H(s)=-G/(1+(1+G)/Ts)--.

Column 20

Line 66, "provides" should read --provide--.

Column 21

Line 54, "present" should read --presentation such as a loser pointer.--

Signed and Sealed this

Thirteenth Day of July, 1999

Attest:

Attesting Officer

Q. TODD DICKINSON

Acting Commissioner of Patents and Trademarks